United States Patent
Beausoleil, Jr. et al.

(10) Patent No.: US 7,133,173 B2
(45) Date of Patent: Nov. 7, 2006

(54) NONLINEAR ELECTROMAGNETIC QUANTUM INFORMATION PROCESSING

(75) Inventors: Raymond G. Beausoleil, Jr., Redmond, WA (US); William J. Munro, Bristol (GB); Timothy P. Spiller, Bristol (GB); Sean D. Barrett, Bristol (GB); Pieter Kok, Cardiff (GB); Kae Nemoto, Tokyo (JP)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 10/899,332

(22) Filed: Jul. 26, 2004

(65) Prior Publication Data

US 2006/0017992 A1    Jan. 26, 2006

(51) Int. Cl.
*G02F 3/00*    (2006.01)
(52) U.S. Cl. .................... 359/108; 359/107
(58) Field of Classification Search .......... 359/107, 359/108
See application file for complete search history.

(56) References Cited

U.S. PATENT DOCUMENTS

| 2003/0086138 | A1* | 5/2003 | Pittman et al. ......... 359/108 |
| 2005/0117836 | A1* | 6/2005 | Franson et al. ........ 385/15 |
| 2005/0133780 | A1* | 6/2005 | Azuma ................... 257/13 |

OTHER PUBLICATIONS

Browne, Daniel et al., "Efficient Linear Optical Quantum Computation" arXiv:quant-ph/0405157 v1, pp. 1-5 (2004).
Franson, J.D. et al., "High-Fidelity Logic Operations Using Linear Optical Elements" Physical Rev. Ltrs., vol. 89, No. 13, pp. 137901-1 -137901-4 (2002).
Gasparoni, Sara et al., "Realization of a Photonic Controlled-NOT Gate Sufficient for Quantum Computation" Physical Rev. Ltrs. vol. 93, No. 2, pp. 020504-1 -020504-4 (2004).
Knill, E. et al., "A Scheme for Efficient Quantum Computation With Linear Optics" Nature, vol. 409, pp. 46-52 (2001).
Pittman, T.B. et al., "Demonstration of Nondeterministic Quantum Logic Operations Using Linear Optical Elements" Physical Rev. Ltrs. vol. 88, No. 25, pp. 257902-1 -257902-4 (2002).
Pittman, T.B. et al., "Cyclical Quantum Memory For Photonic Qubits" Physical Rev. A 66, pp. 062302-1 -062302-4 (2002).

* cited by examiner

*Primary Examiner*—Fayez G. Assaf

(57) ABSTRACT

Nonlinear electromagnetic elements can efficiently implement quantum information processing tasks such as controlled phase shifts, non-demolition state detection, quantum subspace projections, non-demolition Bell state analysis, heralded state preparation, quantum non-demolition encoding, and fundamental quantum gate operations. Direct use of electromagnetic non-linearity can amplify small phase shifts and use feed forward systems in a near deterministic manner with high operating efficiency. Measurements using homodyne detectors can cause near deterministic projection of input states on a Hilbert subspace identified by the measurement results. Feed forward operation can then alter the projected state if desired to achieve a desired output state with near 100% efficiency.

27 Claims, 6 Drawing Sheets

NONLINEAR ELECTROMAGNETIC QUANTUM INFORMATION PROCESSING

BACKGROUND

Quantum information processing generally includes manipulation or use of quantum states to store or communicate information or to perform calculations. A variety of systems having quantum states have been proposed or used in quantum information processing. Optical systems, for example, can manipulate the quantum states of light to perform specific quantum information processing tasks.

A quantum computer architecture based on linear optical elements with nonlinearities induced by photodetection and feed-forward systems was originally proposed by E. Knill, R. Laflamme, and G. J. Milburn, "A scheme for efficient quantum computation with linear optics," Nature 409, 47 (2001). Although this proposal demonstrated that linear optics quantum computation (LOQC) was possible in principle, scalable systems based on this approach required an impractically large supply of quantum resources for reliable operation. Improvements to the proposal of Knill et al. have been developed (and experimentally demonstrated) requiring fewer resources, but these more recent proposals proscribe quantum circuit elements that behave probabilistically. For example, the quantum controlled-NOT gate described by T. B. Pittman, B. C. Jacobs, and J. D. Franson, "Probabilistic quantum logic operations using polarizing beam splitters," Phys. Rev. A 64, 062311 (2001) requires fewer resources than corresponding systems proposed by Knill et al., but does not operate deterministically.

The system proposed by Pittman et al. uses measurement of one or more input photonic qubits and a first set of ancilla photonic qubits. The measurement results allow selection of one or more photonic qubits from a second set of ancilla photonic qubits that are entangled with the first set of ancilla photonic qubits. A problem with this technique is that the selected output photonic qubit has an inherent probability of being incorrect for the gate being implemented. The probability that the system will fail to produce the correct output is typically 75% (assuming perfect photodetectors). A linear quantum optical computer of this type having several such gates is thus extremely wasteful of offline quantum resources (e.g., entangled photons) and may be impractical for complex systems. For example, a quantum circuit including several linear optical quantum gates could perform a computation by operating those gates in parallel; the gates outputs can be teleported into the computation when the gates have functioned properly. Although this approach is scalable, it would require many repetitions of individual gate operations until the computation succeeded, thereby wasting many entangled and ancilla photons.

Optical quantum information processing systems are desired that are deterministic or otherwise efficiently utilize quantum resources. Ideally, such optical systems would also be suitable for miniaturization down to nanometer scales.

SUMMARY

In accordance with an aspect of the invention, nonlinear optical elements such as controlled phase shifters can be used to implement elements such as quantum subspace projectors, Bell state analyzers, quantum encoders, and destructive and nondestructive CNOT gates with near-deterministic performance.

BRIEF DESCRIPTION OF THE DRAWINGS

Use of the same reference symbols in different figures indicates similar or identical items.

DETAILED DESCRIPTION

In accordance with an aspect of the invention, nonlinear optical elements can efficiently implement quantum information processing tasks such as controlled phase shifts, non-demolition state detection, non-demolition Bell state analysis, heralded state preparation, quantum non-demolition encoding, and fundamental quantum gate operations. Direct use of optical non-linearity can amplify small phase shifts and use feed forward systems in a near deterministic manner with high operating efficiency.

A preferred embodiment of the invention uses a nonlinear effect such as Electromagnetically Induced Transparency (EIT) to produce measurable phase shifts and can be implemented using waveguides and interaction sites (e.g., EIT atoms) that can be fabricated using nano-scale structures. For example, R. G. Beausoleil, W. J. Munro, and T. P. Spiller, "Applications of Coherent Population Transfer to Quantum Information Processing," quant-ph/0302109 (2003), also published in Journal of Modern Optics, Vol. 51, No. 11. pp 1559–1601 (2004), describes use of EIT interactions in quantum optical systems that can be fabricated using nanoscale structures. (See also R. G. Beausoleil et al., "Applications of Electromagnetically Induced Transparency to Quantum Information Processing," quant-ph/0403028 (2004), and W. J. Munro et al. "A high-efficiency quantum non-demolition single photon number resolving detector," quant-ph/0310066 (2003). However, embodiments of the invention can be implemented with larger scale structures that use EIT, a general cross-Kerr non-linearity, or other nonlinear photon interactions.

Figure 1:
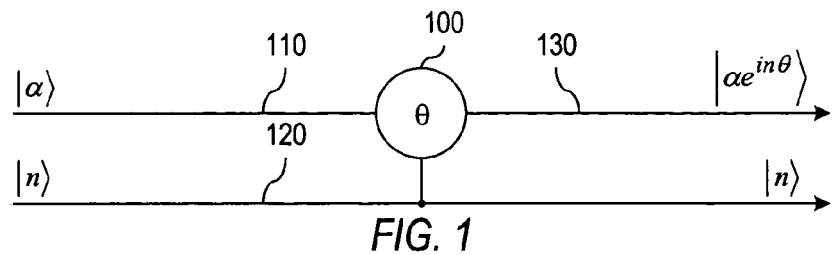
FIG. 1 shows a nonlinear optical element that implements a controlled phase shifter suitable for quantum nondestructive detection.

FIG. 1 schematically illustrates a controlled phase shifter 100 in accordance with an exemplary embodiment of the invention. Controlled phase shifter 100 has a probe mode 110, an input mode 120, and a measurement mode 130. In the operation of phase shifter 100 illustrated in FIG. 1, a coherent photon state $|\alpha\rangle$ is applied in probe mode 110, and an n-photon Fock state $|n\rangle$ is applied to input mode 120. A non-linear interaction of coherent photon state $|\alpha\rangle$ and Fock state $|n\rangle$ in controlled phase shifter 100 causes a phase shift $n\theta$, producing a coherent photon state $|\alpha e^{in\theta}\rangle$ on measurement mode 130. As further described in U.S. patent application Ser. No. 10/412,019, entitled "Photon Number Resolving Systems And Methods," the phase constant $\theta$ of controlled phase shifter 100 depends on the properties of controlled phase shifter 100, so that a measurement of the phase shift $n\theta$ determines the number n of photons in state $|n\rangle$ of input mode 120.

Figure 2A:
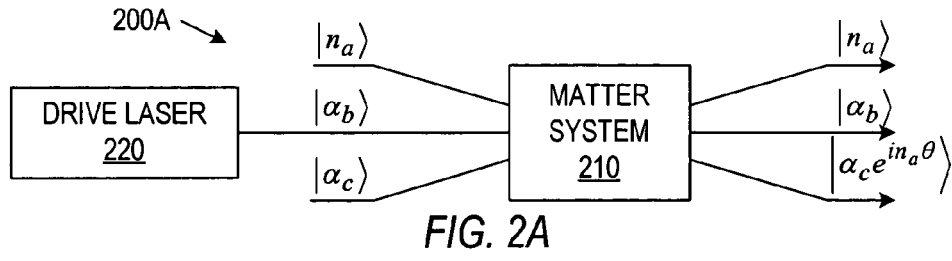
FIGS. 2A, 2B, and 2C show controlled phase shifters in accordance with alternative embodiments of the invention using electromagnetically induced transparency.
Figure 2B:
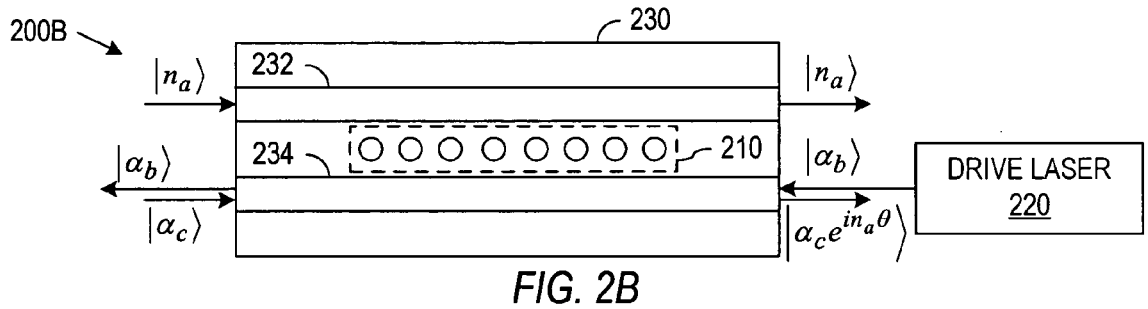
Figure 2C:
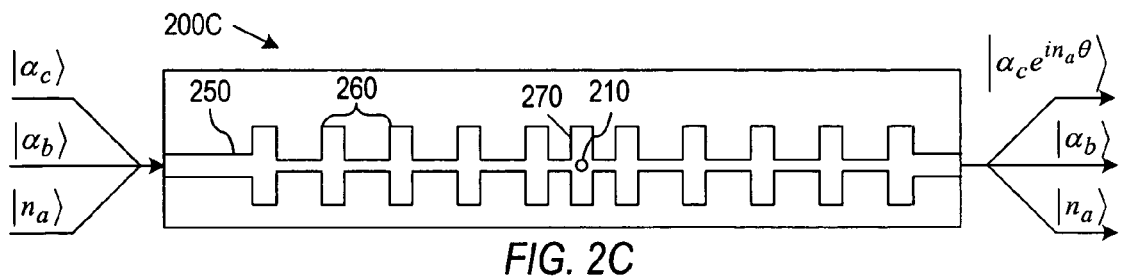

FIGS. 2A, 2B, and 2C illustrate specific implementations of controlled phase shifters 200A, 200B, and 200C using electromagnetically induce transparency (EIT) to induce phase shifts. These EIT systems generally apply photon states to a matter system where nonlinear interactions with the matter system can induce a phase shift without destroying or otherwise altering the quantum state of the photons.

FIG. 2A illustrates a structurally simple phase shifter 200A including a matter system 210 in free space. Matter system 210 can be gas cell or any structure having one or more sites with suitable quantum energy levels for EIT. In phase shifter 200A, photon states $|n_a\rangle$ and $|\alpha_c\rangle$, which respectively correspond to photon states $|n\rangle$ and $|\alpha\rangle$ in FIG. 1, are directed to overlap at the location of matter system 210. The subscripts for states $|n_a\rangle$ and $|\alpha_c\rangle$ identify the frequencies of photons in the respective states. A drive laser 220 further directs a photon state $|\alpha_b\rangle$ to overlap with photon states $|n_a\rangle$ and $|\alpha_c\rangle$ in matter system 210. The overlap of the three photon states $|n_a\rangle$, $|\alpha_b\rangle$, and $|\alpha_c\rangle$ having suitably selected frequencies permits an EIT interaction with a 4-level matter system to induce a phase shift as described further below.

FIG. 2B illustrates a controlled phase shifter 200B suitable for fabrication in a solid-state system. Controlled phase shifter 200B includes a photonic bandgap crystal 230 that contains waveguides 232 and 234. When compared to controlled phase shifter 100 of FIG. 1, waveguide 232 corresponds to input mode 120, and waveguide 234 corresponds to photon modes 110 and 130. A laser 220 also drives waveguide 234 with control photon state $|\alpha_b\rangle$ required for a specific EIT interaction described further below. The direction of propagation photon states $|\alpha_b\rangle$ and $|\alpha_c\rangle$ can be opposite to simplify separation of the modes for measurement or use. For the EIT interaction, a matter system 210 is preferably confined in photonic bandgap crystal 230 at a location such that the evanescent fields corresponding to photons in waveguides 232 and 234 interact with matter system 210, and the interaction creates a phase shift in probe photon state in waveguide 234.

FIG. 2C illustrates phase shifter 200C including a waveguide 250 with a periodic series of cells 260. Waveguide 250 can be formed of a high index material (e.g., $\epsilon=12$) surrounded with air or other low index material (e.g., $\epsilon=1$). In an exemplary embodiment, waveguide 250 has a thickness 0.55t where t is the period of cells 260. Each cell 260 can be a thick segment (e.g., of thickness 1.25t and length 0.4t), followed by a thin segment (e.g., of thickness 0.25t and length 0.6t). A cavity 270 can be implemented by introducing a defect into a periodic structure 260. For example, narrowing the length of the central thick element to 0.3t, and narrowing the length of the two neighboring thin elements to 0.25t can introduce cavity/defect 270. A matter system 210 can be located in cavity 270.

Photon states $|n_a\rangle$, $|\alpha_b\rangle$, and $|\alpha_c\rangle$ are all input to waveguide 250 and traverse cavity 270, which contains matter system 210. The slow light effect induced using periodic cells 260 and cavity 270 increases the interaction time of photon states $|n_a\rangle$, $|\alpha_b\rangle$, and $|\alpha_c\rangle$ with matter system 210 and may correspondingly increase the phase shift of phase shifter 200C. Output photon states $|n_a\rangle$, $|\alpha_b\rangle$, and $|\alpha_c e^{in_a\theta}\rangle$ from waveguide 250 can be separated using conventional beam separation methods such as polarization and/or frequency based techniques. For example, photon state $|n_a\rangle$ can have TE polarization in waveguide 250 while $|\alpha_b\rangle$ and $|\alpha_c\rangle$ have an orthogonal TM polarization. A polarizing beam splitter can then separate state $|n_a\rangle$ from states $|\alpha_b\rangle$ and $|\alpha_c\rangle$, and a frequency filter can remove state $|\alpha_b\rangle$ to leave separated state $|\alpha_c\rangle$.

Figure 3:
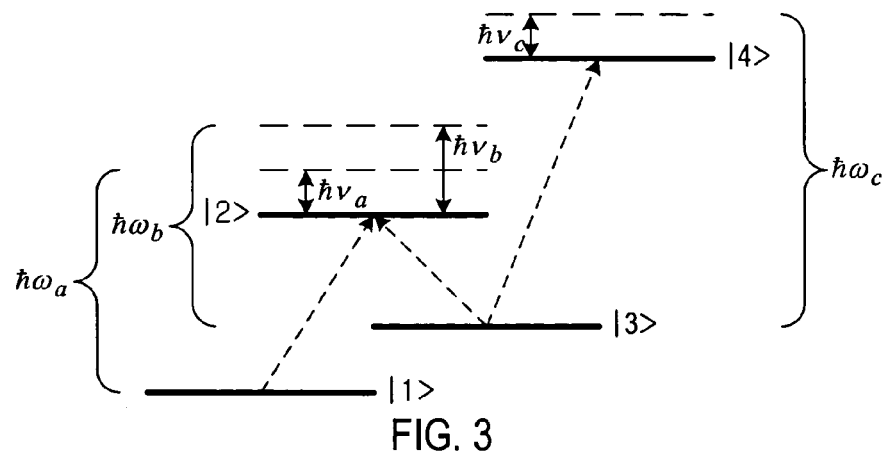
FIG. 3 is an energy level diagram for a matter system used in the controlled phase shifters of FIGS. 2A, 2B, and 2C.

In an exemplary embodiment, matter system 210 in controlled phase shifter 200A, 200B, or 200C includes at least one atom, molecule, or other structure having four states $|1\rangle$, $|2\rangle$, $|3\rangle$, and $|4\rangle$ with quantum energy levels as shown in FIG. 3. The photon states $|n_a\rangle$, $|\alpha_b\rangle$, and $|\alpha_c\rangle$ correspond to modes having respective angular frequencies $\omega_a$, $\omega_b$, and $\omega_c$ that are selected according to the energy levels of matter system 210 but can otherwise be in any range of the electromagnetic spectrum including optical frequencies, radio/microwave frequencies, and other telecom frequencies. In general, angular frequencies $\omega_a$, $\omega_b$, and $\omega_c$ couple to corresponding transitions between the quantum energy levels of matter system 210. In particular, with the energy levels of FIG. 3, photons of angular frequency $\omega_a$ couple atomic energy state $|1\rangle$ to energy state $|2\rangle$. Photons of angular frequency $\omega_b$ and $\omega_c$ couple the metastable energy state $|3\rangle$ to energy states $|2\rangle$ and $|4\rangle$, respectively.

The relative order of the energy levels illustrated in FIG. 3 is merely an example, and more generally, a reordering of energy levels would still permit EIT. In particular, although FIG. 3 shows the fourth energy state $|4\rangle$ as being higher in energy than the second energy state $|2\rangle$, the second state $|2\rangle$ as being higher in energy than the third energy state $|3\rangle$, and the third energy state $|3\rangle$ as being higher in energy than the first energy state $|1\rangle$, EIT can be produced with a matter system that provides an arbitrary ordering of these energy levels.

Third energy state $|3\rangle$ is preferably metastable in that no single-photon spontaneous emission is permitted. Such metastability may result, for example, if the spin/angular momentum of energy state $|3\rangle$ and available lower energy states are such that a conservation law forbids emission of a single photon during a transition of the matter system from energy state $|3\rangle$ to a lower energy state. Spontaneous transitions from the fourth energy state $|4\rangle$ (e.g., to the first state $|1\rangle$ or second state $|2\rangle$) can be similarly suppressed either by selecting a matter system 210 such that the fourth energy state $|4\rangle$ is metastable or by selecting the properties of photonic bandgap crystal 230 to inhibit or prohibit propagation of photons having angular frequencies corresponding to the transitions from the fourth energy state $|4\rangle$.

Detuning parameters $v_a$, $v_b$, and $v_c$ in FIG. 3 indicated the respective amount of detuning of angular frequencies $\omega_a$, $\omega_b$, and $\omega_c$ from resonances of the energy level transitions of matter system 210 as indicated in Equations 1. In Equations 1, the energy differences between states |1> and |2>, between |3> and |2>, and between |3> and |4> are $\hbar\omega_{12}$, $\hbar\omega_{32}$, and $\hbar\omega_{34}$, respectively.

$$\hbar\omega_a = \hbar(\omega_{12} + v_a)$$

$$\hbar\omega_b = \hbar(\omega_{32} + v_b)$$

$$\hbar\omega_c = \hbar(\omega_{43} + v_c) \quad \text{Equations 1}$$

EIT makes matter system 210 transparent to photons of angular frequency $\omega_a$ or $\omega_c$ while laser 220 is driving matter system 210 with photons having angular frequency $\omega_b$. When photons of angular frequencies $\omega_a$, $\omega_b$, and $\omega_c$ simultaneously interact with matter system 210, the state of photons having angular frequencies $\omega_a$ and $\omega_c$ picks up an overall phase shift that depends on the number $n_a$ of photons having angular frequency $\omega_a$ and the number $n_c$ of photons having angular frequency $\omega_c$. The size of the phase shift can also depend on the detuning parameters $v_a$, $v_b$, and $v_c$, the relative polarization of the photons, and properties of matter system 210.

The phase shift or evolution of the coherent probe states $|\alpha_c\rangle$ can be derived from the evolution of Fock states. In particular, Fock states components containing $n_a$, $n_b$, and $n_c$ photons respectively drive the three frequency channels of the resonant four-level manifold of matter system 210. If matter system 210 includes N four-level atoms that are fixed and stationary in a volume that is small compared to the optical wavelengths, and if the durations of the three pulse envelope functions of the Fock states are long compared to the lifetime of atomic level 2, the unperturbed photon number eigenstate $|1, n_a, n_b, n_c\rangle$ evolves as indicated in Equation 2, where 1 identifies the state of the matter system and $n_a$, $n_b$, $n_c$ are the numbers of photons in the respective modes.

$$|1, n_a, n_b, n_c\rangle \to e^{-iWt}|1, n_a, n_b, n_c\rangle \quad \text{Equation 2}$$

The quantity W in Equation 2 generally depends on the properties of the matter system 210 and the angular frequencies $\omega_a$, $\omega_b$, and $\omega_c$. Equations 3A and 3B give the quantity W in the case where angular frequencies $\omega_a$ and $\omega_b$ are precisely tuned to the respective atomic transition angular frequencies $\omega_{12}$ and $\omega_{32}$, dephasing is negligible, and the spontaneous emission branching ratios from atomic levels 2 and 4 are approximately unity. In Equation 3A, N is the number of four-level atoms, $\Omega_a$, $\Omega_b$, and $\Omega_c$ are the effective vacuum Rabi frequencies as given in Equation 3B, $v_c$ is the detuning parameter $(\omega_c - \omega_{43})$, and $\gamma_2$ and $\gamma_4$ are approximately equal to the spontaneous emission rates $A_{21}$ and $A_{43}$. In Equation 3B, k is an index having values a, b, and c; $\sigma_k$ by definition is the resonant atomic absorption cross-section $3\lambda_k^2/2\pi$ at wavelength $\lambda_k \approx 2\pi c/\omega_k$; $\pi w^2$ is the effective laser mode cross-sectional area, $A_k$ is the spontaneous emission rate between two corresponding atomic levels; and $\Delta\omega_k$ is the bandwidth of the profile function describing the adiabatic interaction of a pulsed laser field with a stationary atom.

Equation 3A:

$$W = \frac{N|\Omega_a|^2|\Omega_c|^2 n_a n_c}{v_c|\Omega_b|^2 n_b + i(\gamma_4|\Omega_b|^2 n_b + \gamma_2|\Omega_c|^2 n_c)}$$

Equation 3B:

$$|\Omega_k|^2 = \frac{1}{8\pi}\frac{\sigma_k}{\pi w^2} A_k \Delta\omega_k$$

Equation 3A indicates that W for four-level EIT systems is complex, indicating potential absorption of the photons of frequency $\omega_a$. However, in the parameter regime where the inequality of Equation 4 is satisfied, the probability that one of the atoms will scatter a single photon of angular frequency $\omega_a$ becomes small. (Equation 4 simplifies to the requirement that $v_c/\gamma_4$ be large when $|\Omega_b|^2|\alpha_b|^2/\gamma_2$ is about equal to $|\Omega_c|^2|\alpha_c|^2/\gamma_4$). Working in this regime, the state $|1, n_a, n_b, n_c\rangle$ acquires purely a phase-shift from the nonlinear mechanism. This phase shift can be the basis of high-efficiency nonlinear optical elements for quantum information processing.

Equation 4:

$$\frac{|\Omega_b|^2|\alpha_b|^2}{\gamma_2}\frac{v_c}{\gamma_4} \gg \frac{|\Omega_b|^2|\alpha_b|^2}{\gamma_2} + \frac{|\Omega_c|^2|\alpha_c|^2}{\gamma_4}$$

The evolution of the atom-field state including coherent state $|\alpha_b\rangle$ and coherent probe state $|\alpha_c\rangle$ can be evaluated using sums over Fock states representing each coherent state. In particular, Equation 5 shows the evolution after a time t of an N-atom quantum state during an interaction with an $n_a$-photon Fock state in the a channel, and weak coherent states parameterized by $\alpha_b$ and $\alpha_c$ in the b and c channels, respectively. Equation 6 defines the phase shift $\theta$. Equations 5 and 6 show that an evolved state $|\psi'(n_a)\rangle$ is not a simple tensor product of a Fock state with two coherent states unless the magnitude of parameter $\alpha_b$ of the original b channel coherent state is large, in which case, evolved state $|\psi'(n_a)\rangle$ is about equal to $|1, n_a, \alpha_b, \alpha_c e^{-in_a\theta}\rangle$. Therefore, only when the coupling field driving channel b is a classical field does the EIT matter system provide an exact cross-Kerr nonlinearity; and for a weak coherent state input pulse, treating this control field as a classical field is not allowed. Equations 5 and 6 also show that in the cavity-enhanced embodiment of FIG. 2C, the evolution may be able to achieve larger phase shifts $\theta$ because the Rabi frequencies can be much larger than the decoherence rates.

Equation 5:

$$|\psi(n_a)\rangle \equiv |1, n_a, \alpha_b, \alpha_c\rangle =$$

$$e^{-\frac{1}{2}(|\alpha_b|^2+|\alpha_c|^2)} \sum_{n_b=0}^{\infty} \sum_{n_c=0}^{\infty} \frac{\alpha_b^{n_b} \alpha_c^{n_c}}{\sqrt{n_b! n_c!}} |1, n_a, n_b, n_c\rangle \to |\psi'(n_a)\rangle =$$

$$e^{-\frac{1}{2}|\alpha_b|^2} \sum_{n_b=0}^{\infty} \frac{\alpha_b^{n_b}}{\sqrt{n_b!}} |1, n_a, n_b, \alpha_c e^{-in_a\theta|\alpha_b|^2/n_b}\rangle$$

Equation 6:

$$\theta \equiv \chi' \equiv \frac{N|\Omega_a|^2|\Omega_c|^2}{v_c|\Omega_b|^2|\alpha_b|^2} t$$

Accordingly, if state $|\alpha_c\rangle$ is known, and if unmeasured properties such as the polarization of photons in state $|n_a\rangle$ are fixed, the controlled phase shifter 200A, 200B, or 200C can provide a phase shift that is approximately proportional to the number $n_a$ of photons in input state $|n_a\rangle$. These results are not unique to selection of photons of angular frequency $\omega_c$ or a coherent state for the probe state or angular frequency $\omega_a$ for the input state in the EIT system described above. Further, other systems that introduce a cross-Kerr nonlinearity can similarly introduce phase shifts in a probe state. Accordingly, the following descriptions drops the subscripts from the probe state $|\alpha\rangle$ and input state $|n\rangle$, with the understanding that in a specific embodiment using EIT, the angular frequencies of the photons can be selected as described above.

In general, the phase shift in probe state $|\alpha\rangle$ depends on the polarizations of states $|\alpha\rangle$ and $|n\rangle$ because the interaction of probe state $|\alpha\rangle$ with control state $|n\rangle$, and therefore the phase constant $\theta$, generally depends on photon polarizations. A measurement of the phase shift in phase shifter 100, 200A, 200B, or 200C can identify a photon polarization and thus project/change the polarization state of the photons in the input mode. However, the phase shifting capabilities of the controlled phase shifter described above can be used in a system that preserves the polarization of the input state photons while measuring the number of input state photons.

Figure 4:
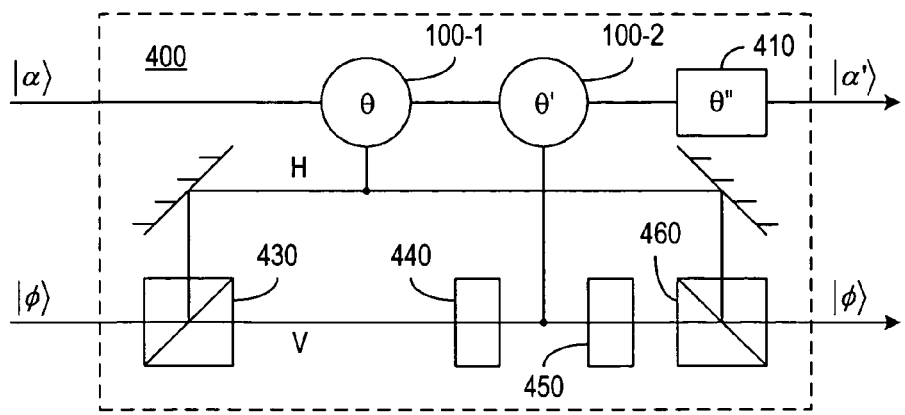
FIG. 4 shows a polarization-preserving photon number resolving phase shifter in accordance with an embodiment of the invention.

FIG. 4 illustrates a general phase shifter 400 that shifts the phase of a probe state $|\alpha\rangle$ by a phase shift that depends on the number and polarizations of photons in an input state $|\phi\rangle$. In an exemplary application of phase shifter 400, input state $|\phi\rangle$ is an eigenstate of polarization having a definite number p of horizontally polarized and a definite number q of vertically polarized photons (i.e., in the exemplary case, $|\phi\rangle \equiv |H^p V^q\rangle$).

System 400 includes a fixed phase shifter 410 and two controlled phase shifters 100-1 and 100-2. Phase shifter 410 causes a fixed shift $\theta''$ in the phase of probe state $|\alpha\rangle$ and can be implemented using a linear retarder (or omitted for the case where fixed shift $\theta''$ is equal to zero.) Both controlled phase shifters 100-1 and 100-2 also act on probe state $|\alpha\rangle$ but under the control of different polarization components of state $|\phi\rangle$. Phase shifters 100-1 and 100-2 have respective phase constants $\theta$ and $\theta'$, which in general may differ from each other. As illustrated in FIG. 4, beam splitter 430 splits input state $|\phi\rangle$ according to polarization. A first polarization component (e.g., a component state corresponding to horizontally polarized photons) controls controlled phase shifter 100-1. In the case where the horizontally polarized component of state $|H^p V^q\rangle$ controls phase shifter 100-1, controlled phase shifter 100-1 introduces a phase shift $p\theta$.

Optionally, a polarization-changing element 440 can change the polarization of the second polarization component of state $|\phi\rangle$ to the same polarization as the first polarization component. For example, polarization changing element 440 can be a half-wave plate oriented to change the polarization of photons in the second component from vertically polarized to horizontally polarized. The polarization transformed state output from element 440 controls phase shifter 100-2. A second polarization changing element 450 undoes or reverses the polarization change that element 440 caused in the second polarization component, so that a beam combiner 460 can recombine the first and second polarization components and reconstruct state $|\phi\rangle$. Such polarization changes can simplify implementation of phase shifters 100-1 and 100-2 that have the same phase constant, i.e., for a specific case where constants $\theta$ and $\theta'$ are equal. However, polarization-changing element 440 and 450 may be unnecessary in an embodiment of the invention in which constants $\theta$ and $\theta'$ are not the same.

In the case where the vertically polarized component of state $|H^p V^q\rangle$ controls phase shifter 100-2, controlled phase shifter 100-2 introduces a phase shift $q\theta'$. The total phase shift in probe state $|\alpha\rangle$ in phase shifter 400 is the sum of the phase shifts from phase shifters 100-1, 100-2, and 410, i.e., $p\theta+q\theta'+\theta''$.

Phase shifter 400 will be a polarization-preserving phase shifter if phase shifters 100-1 and 100-2 are identical. In particular, the shift arising in phase shifter 100-1 is proportional to the number of photons in the first polarization component of state $|\phi\rangle$, and the shift arising in phase shifter 100-2 is proportional to the number of photons in the second polarization component of state $|\phi\rangle$. However, since the control photons for both controlled phase shifters 100-1 and 100-2 have the same polarization, the polarization constants $\theta$ of phase shifters 100-1 and 100-2 are the same if phase shifters 100-1 and 100-2 are the same. With use of identical phase shifter 100-1 and 100-2 and no fixed shifter 410, the total phase shift in probe state $|\alpha\rangle$ is proportional to the number p+q of photons in state $|\phi\rangle$, and even with non-zero fixed phase shift, the output state from phase shifter 400 can be expressed as a product of state $|\phi\rangle$ and a phase shifted state $|\alpha'\rangle$. A measurement of the total phase shift determines a total number p+q of photons in the state, but the measurement does not determine polarization information and does not change the polarization state. Accordingly, when phase shifters 100-1 and 100-2 are identical, phase shifter 400 preserves the polarization state of input state $|\phi\rangle$ even when the number p+q of photons is measured.

One specific polarization-preserving embodiment of phase shifter 400 has phase constants $\theta$ and $\theta'$ that are the same but are the negative of fixed phase shift $\theta''$. In this embodiment, a phase shift $\theta$ in probe state $|\alpha\rangle$ results when input state $|\phi\rangle$ contains two photons. No phase shift in probe state $|\alpha\rangle$ results when input state $|\phi\rangle$ contains one photon, and a phase shift $-\theta$ in probe state $|\alpha\rangle$ results when input state $|\phi\rangle$ is the vacuum state. A measurement of probe state $|\alpha\rangle$ can determine whether the output state contains 0, 1, or 2 photons from the sign of the measured phase shift and whether the measured phase shift is non-zero. If the input state is a superposition of Fock states all with the same polarization, such a measurement projects the input state onto the Fock state having the number p+q of photons corresponding to the measurement outcome but does not reveal or change the polarization.

Another specific embodiment of phase shifter 400 has fixed phase shift $\theta''$ equal to $-\theta$ and has phase constant $\theta'$ is equal to zero. This configuration of phase shifter 400 does not necessarily preserve the polarization state but provides an example of the use of phase shifts to project the input state onto specific polarization subspaces. In this embodiment, a phase shift $\theta$ in probe state $|\alpha\rangle$ results when input state $|\phi\rangle$ contains two horizontally polarized photons. No phase shift in probe state $|\alpha\rangle$ results when input state $|\phi\rangle$ contains one horizontally polarized photon, and a phase shift $-\theta$ in probe state $|\alpha\rangle$ results when input state $|\phi\rangle$ is the vacuum state or only includes vertically polarized photons. A measurement of probe state $|\alpha\rangle$ will project state $|\phi\rangle$ states onto states having a number of horizontally polarized photons determined from the sign and magnitude of the phase shift.

Figure 5:
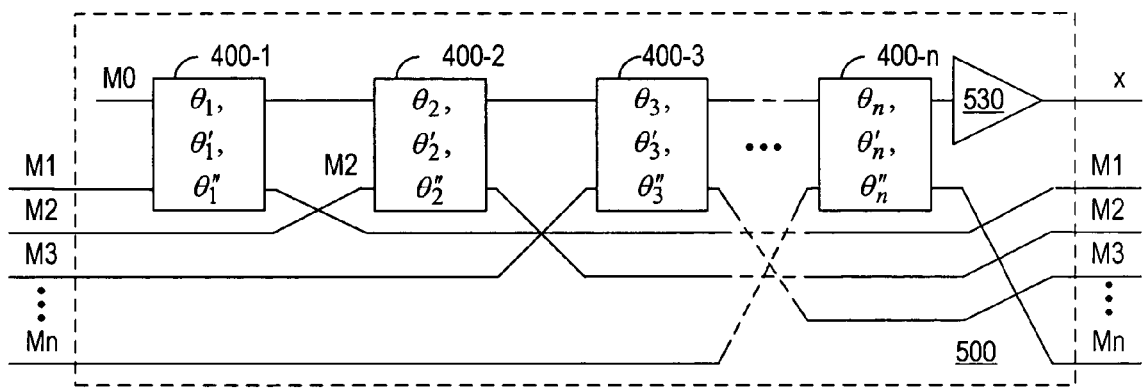
FIG. 5 shows an n-mode quantum subspace projector in accordance with an embodiment of the invention.

More generally combining phase shifters such as illustrated in FIG. 4 with a suitable measurement of a probe state can project a general input state onto a desired Hilbert subspace. FIG. 5, for example, illustrates an n-mode quantum subspace projector 500 in accordance with an embodiment of the invention using n phase shifters 400-1 to 400-n and a measurement system 530. As illustrated, projector 500 has a mode M0 for input of a probe state, e.g., a coherent state |α>, and n modes M1 to Mn for input of a general n-mode photon state |Ψ>. Each phase shifter 400-i corresponds to a photon mode Mi and in generally has three phase constant $\theta_i$, $\theta'_i$, and $\theta''_i$. Phase constant $\theta_i$ applies to phase shifts associated with horizontally polarized photons in mode i. Phase constant $\theta'_i$ applies to phase shifts associated with vertically polarized photons in mode i, and phase constant $\theta''_i$ corresponds to a fixed phase shift that the phase shifter 400-i applies to probe state |α>.

Measurement system 530 extracts information about the total phase shift that the probe mode M0 acquires in phase shifters 400-1 to 400-n. As a result of the measurement, projector 500 projects the state of modes M1 to Mn into a Hilbert subspace that is spanned by states that are consistent with the measurement. The Hilbert subspace that is the target of the projection will in general depend upon the phase constants $\theta_1$ to $\theta_n$, $\theta'_1$ to $\theta'_n$, and $\theta''_1$ to $\theta''_n$ and on the specific measurement result obtained by measurement system 530. Additional optical components may be added to this system to adjust relative phases or provide other corrections based on the outcome of the measurement.

Figure 6A:
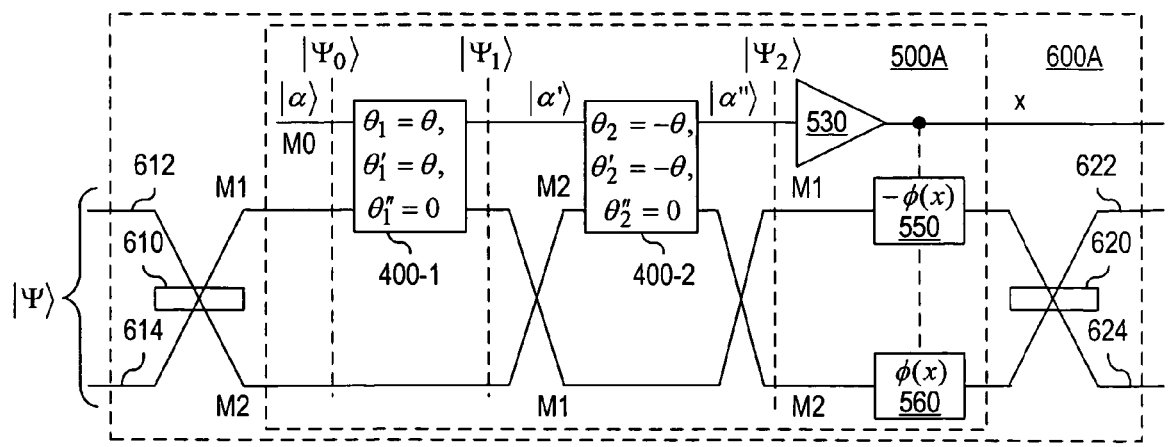
FIGS. 6A and 6B show non-absorbing symmetry analyzers in accordance with alternative embodiments of the invention using different 2-mode quantum subspace projectors.

One useful 2-mode quantum subspace projector projects a general 2-mode state onto either the Hilbert subspace spanned by "symmetric" Bell states or onto an antisymmetric Bell state. FIG. 6A illustrates a non-absorbing symmetry analyzer 600A in accordance with an embodiment of the invention that measures a phase shift in a probe state |α> to obtain information regarding the symmetry of a 2-qubit input state |Ψ>. The two-qubit state |Ψ> is generally a superposition of terms each of which has a photon state in mode 612 and a photon in mode 614. These input modes meet on a beam splitter 610 having output modes M1 and M2 that enter a 2-mode quantum subspace projector 500A. A second beam splitter 620 has modes M1 and M2 from projector 500A as input modes and operates to return photon states associated with input modes 612 and 614 respectively to output modes 622 and 624.

The 2-mode quantum subspace projector 500A is a specific example of projector 500 of FIG. 5 when the number of modes is two. In particular, projector 500A includes polarization preserving phase shifters 400-1 and 400-2 that act on a probe state in a mode M0 and are respectively controlled by photon states on modes M1 and M2. Each phase shifter 400-1 and 400-2 can be substantially the same as and constructed in the same manner as polarizing preserving phase shifter 400 of FIG. 4. The specific choice of phase constants for phase shifter 400-1 in projector 500A are $\theta_1=\theta$, $\theta'_1=\theta$, and $\theta''_1=0$, and the phase constants for phase shifter 400-2, are $\theta_2=-\theta$, $\theta'_2=-\theta$, and $\theta''_2=0$, making both phase shifters 400-1 and 400-2 polarization-preserving phase shifters.

Two-qubit input state |Ψ> can be expressed without loss of generality as a linear combination of Bell states as indicated in Equation 7, where states |B$_1$>, |B$_2$>, |B$_3$>, and |B$_4$> are normalized Bell states and coefficients $a_1$, $a_2$, $a_3$, and $a_4$ are complex probability amplitudes for respective Bell states |B$_1$>, |B$_2$>, |B$_3$>, and |B$_4$>. Linearity of quantum mechanics ensures that all results are valid also for superpositions and mixed states.

$$|\Psi\rangle = a_1|B_1\rangle + a_2|B_2\rangle + a_3|B_3\rangle + a_4|B_4\rangle \quad \text{Equation 7}$$

Bell states |B$_1$>, |B$_2$>, |B$_3$>, and |B$_4$> have the form given in Equations 8 in a representation where the binary values 0 and 1 of each qubit respectively correspond to horizontal (H) and vertical (V) polarization of photons. Herein, a state |H$^p$V$^q$,H$^r$V$^s$> indicates a state having p horizontally polarized and q vertically polarized photons in a first mode (e.g., mode 612) and r horizontally polarized and s vertically polarized photons in a second mode (e.g., mode 614). An important characteristic of the Bell states is that an operation that swaps photon modes (e.g., interchanges photon modes 612 and 614) takes Bell state |B$_1$> to its negative −|B$_1$> but takes each of the other Bell states |B$_2$>, |B$_3$> and |B$_4$> respectively back to themselves. Bell state |B$_1$> is thus antisymmetric under this transformation and is sometimes referred to herein as the singlet state. In contrast, the other three Bell states |B$_2$>, |B$_3$>, and |B$_4$> are unchanged by the swap transformation and are sometimes referred to herein as symmetric states.

Equations 8:

$$|B_1\rangle \equiv \frac{1}{\sqrt{2}}(|H, V\rangle - |V, H\rangle)$$

$$|B_2\rangle \equiv \frac{1}{\sqrt{2}}(|H, V\rangle + |V, H\rangle)$$

$$|B_3\rangle \equiv \frac{1}{\sqrt{2}}(|H, H\rangle - |V, V\rangle)$$

$$|B_4\rangle \equiv \frac{1}{\sqrt{2}}(|H, H\rangle + |V, V\rangle)$$

In non-absorbing symmetry analyzer 600A, beam splitter 610 interferes photons from modes 612 and 614 and (for a particular choice of phase convention for beam splitter 610) transforms Bell states as indicated in Equations 9. As can be seen from Equations 9, beam splitter 610 transforms the singlet state |B$_1$> back to the negative of itself and transforms the symmetric Bell states |B$_2$>, |B$_3$>, and |B$_4$> into linear combinations of states having two photons in one mode M1 or M2 and no photons in the other mode M2 or M1. This property allows analysis of state |Ψ> and particularly projection of state |Ψ> either into the antisymmetric Hilbert subspace (i.e., onto singlet state |B$_1$>) or onto the symmetric Hilbert space spanned by Bell states |B$_2$>, |B$_3$>, and |B$_4$>.

Equations 9:

$$|B_1\rangle \to -|B_1\rangle$$

$$|B_2\rangle \to \frac{1}{\sqrt{2}}(|HV, 0\rangle - |0, HV\rangle)$$

$$|B_3\rangle \to \frac{1}{2}(|H^2, 0\rangle - |0, H^2\rangle - |V^2, 0\rangle + |0, V^2\rangle)$$

$$|B_4\rangle \to \frac{1}{2}(|H^2, 0\rangle - |0, H^2\rangle + |V^2, 0\rangle - |0, V^2\rangle)$$

As noted above, the photon states on output modes M1 and M2 of polarizing beam splitter 610 respectively control polarization preserving phase shifters 400-1 and 400-2. More specifically, the photon state output from beam splitter 610 on mode M1 controls polarization preserving phase shifter 400-1, so that phase shifter 400-1 introduces a phase shift $n_1\theta$ to probe state |α>. The phase shift thus depends on the number $n_1$ of photons in mode M1 and the phase constant $\theta$ of polarization preserving phase shifter 400-1.

Polarization preserving phase shifter 400-2 has a phase constant $-\theta$ that is the negative of the phase constant $\theta$ of phase shifter 400-1. Generally, 4-level EIT phase shifters can produce phase shifts. Two phase shifters can produce phase shifts with opposite sign if the detuning constant $v_c$ of the angular frequency $\omega_c$ for one of the matter systems in one phase shifter is the negative of the corresponding detuning constant $v_c$ for the matter systems in the other phase shifter. The output mode M2 from beam splitter 610 controls polarization preserving-phase shifter 400-2, so that phase shifter 400-2 introduces a second phase shift $-n_2\theta$ of probe state $|\alpha\rangle$, where $n_2$ is the number of photons in mode M2.

If state $|\Psi\rangle$ is the singlet state $|B_1\rangle$, modes M1 and M2 from beam splitter 400-1 will each contain a single photon. Phase shifter 620 will thus introduce a phase shift $\theta$, e.g., $|\alpha'\rangle = |\alpha e^{i\theta}\rangle$, and phase shifter 400-2 introduces an opposite phase shift $-\theta$. As a result, there is no net phase shift, i.e., $|\alpha''\rangle = |\alpha\rangle$, if state $|\Psi\rangle$ is the singlet state $|B_1\rangle$.

If state $|\Psi\rangle$ is in the symmetric part of the Hilbert space, i.e., is a linear combination of the symmetric Bell states $|B_2\rangle$, $|B_3\rangle$, and $|B_4\rangle$, the output modes M1 and M2 from beam splitter 610 are in a superposition of 2-photon states in mode M1 with a vacuum state in mode M2 and 2-photon states in mode M2 with a vacuum state in mode M1. The state having two photons in mode M1 causes a phase shift of $2\theta$ in probe state $|\alpha\rangle$, and the state having two photons in mode M2 causes a phase shift of $-2\theta$ in probe state $|\alpha\rangle$. A detector 630 that can measure the magnitude of the phase shift can thus distinguish the singlet state $|B_1\rangle$ from a state that is in the symmetric Hilbert space spanned by Bell states $|B_2\rangle$, $|B_3\rangle$, and $|B_4\rangle$. For the desired projection, it is critical that the measurement not determine the sign of the phase shift.

In the case where analyzed state $|\Psi\rangle$ is a general linear combination of Bell states as in Equation 7, the operation of phase shifters 400-1 and 400-2 creates a state $|\Psi_2\rangle$ in which the mode M0 probe state is entangled with the mode M1 and M2 states. For example, if beam splitter 610 produces a state $|\Psi_0\rangle$ of the form of Equation 10, the action of phase shifter 400-1 produces the state $|\Psi_1\rangle$ shown in Equation 11. Phase shifter 400-2 then produces a state $|\Psi_2\rangle$ having the form indicated in Equation 12. (In Equations 10, 11, and 12, the polarizations of the photons are ignored because the phase shifts associated with polarization preserving phase shifters 400-1 and 400-2 are independent of the polarizations.)

$|\Psi_0\rangle = |\alpha\rangle [a(|2,0\rangle - |0,2\rangle) + b|1,1\rangle]$   Equation 10

$|\Psi_1\rangle = a|\alpha e^{i2\theta}\rangle|2,0\rangle - a|\alpha\rangle|0,2\rangle + b|\alpha e^{i\theta}\rangle|1,1\rangle$   Equation 11

$|\Psi_2\rangle = a|\alpha e^{i2\theta}\rangle|2,0\rangle - a|\alpha e^{-2\theta}\rangle|0,2\rangle + b|\alpha\rangle|1,1\rangle$   Equation 12

Figure 7A:
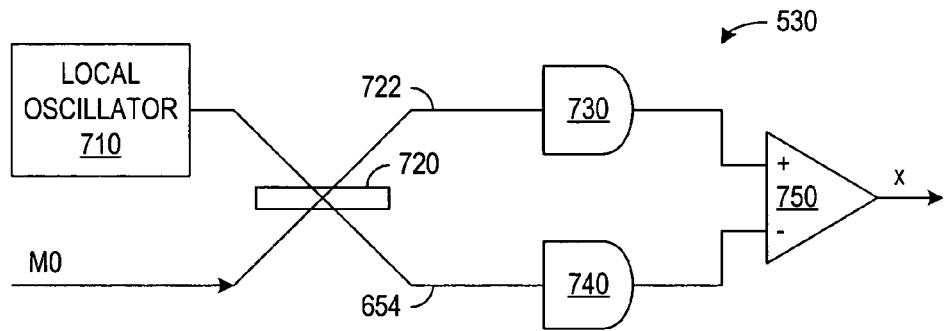
FIG. 7A shows a homodyne detector suitable for use in the subspace projector of FIG. 5 or the symmetry analyzer of FIG. 6A or 6B.

In an exemplary embodiment of the invention, measurement system 530 is a homodyne detector such as illustrated in FIG. 7A. Homodyne detector 530 includes a local oscillator 710, a beam splitter 720, photodiodes or detectors 730 and 740, and a differential amplifier 750. Local oscillator 710 preferably produces a reference coherent state of the same wavelength as probe state $|\alpha\rangle$. Beam splitter 720 interferes the photon state from mode M0 with the reference state with different relative signs in the two output modes from beam splitter 720. Photodiodes 730 and 740 generate currents proportional to the respective intensities of the interfering photon states in the respective output modes from beam splitter 720, and differential amplifier 750 generates a measurement signal x indicating a difference between the photodiode currents.

It is known that a homodyne detector such as detector 530 of FIG. 7A effectively measures a value of a quadrature operator $\hat{X}(\phi)$ of the form given in Equation 13. In Equation 13, operators $a^\dagger$ and $a$ are respectively the creation and annihilation operators for probe mode M0, and $\phi$ is the phase difference between probe state $|\alpha\rangle$ and the reference state from local oscillator 710. A single measurement by the homodyne detector will yield an eigenvalue of operator $\hat{X}(\phi)$. For the special case where phase difference $\phi$ is zero, a measurement by detector 530 is commonly referred to as a measurement of the X-quadrature.

$\hat{X}(\phi) = a^\dagger e^{-i\phi} + ae^{i\phi}$ $\hat{X}(0) \equiv \hat{X} = a^\dagger + a$   Equations 13

A homodyne measurement in symmetry analyzer 600 for FIG. 6A projects the photon state in mode M0 onto an eigenstate of operator $\hat{X}(\phi)$. An unnormalized state $|\Psi_3\rangle$ resulting from projection onto an eigenstate $|x\rangle$ in the specific case where phase difference $\phi$ is zero and state $|\Psi_2\rangle$ has the form indicated in Equation 12 is shown in Equation 14. Equation 15 indicates the results of evaluation of the inner products in Equation 14. From Equation 15, a measurement outcome x that is approximately equal to $2\alpha$, i.e., $x \approx 2\alpha$, projects state of the M1 and M2 mode photons to a state that is approximately equal to state $|1,1\rangle$, and therefore corresponds to the singlet state $|B_1\rangle$. A measurement outcome x that is approximately equal to $2\alpha \cos(2\theta)$, i.e., $x \approx 2\alpha \cos(2\theta)$, projects the mode M1 and M2 photons to $e^{i\Phi(x)}|2,0\rangle - e^{-i\Phi(x)}|0,2\rangle$, which corresponds to a state in the symmetric Hilbert state of Bell states $|B_2\rangle$, $|B_3\rangle$, and $|B_4\rangle$.

Figure 7B:
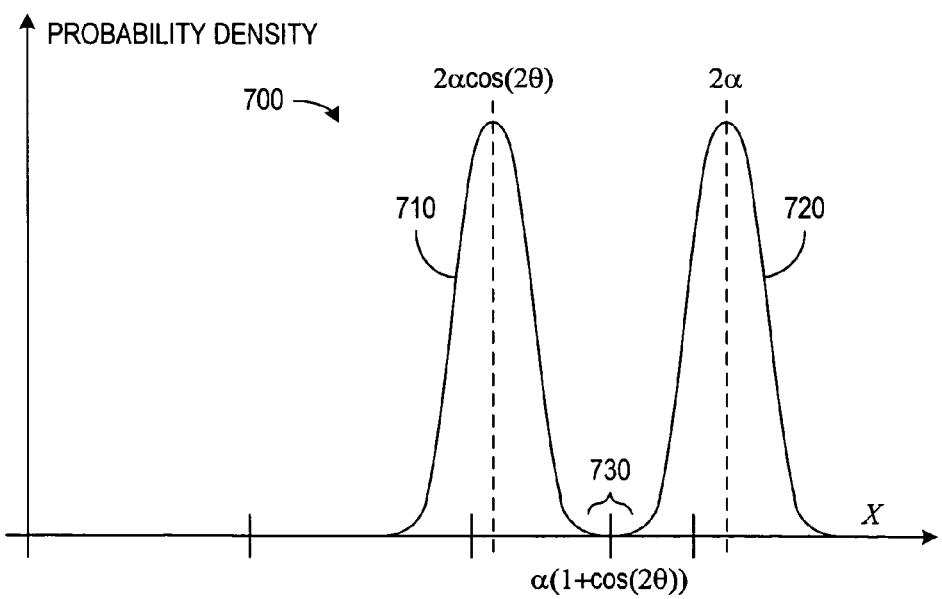
FIG. 7B shows a probability distribution for homodyne measurements taken during analysis of the symmetry of a 2-qubit state.

Equation 14:

$|\Psi_3\rangle = |x\rangle\langle x|\Psi_2\rangle = |x\rangle(\langle x|\alpha e^{i2\theta}\rangle a|2,0\rangle - \langle x|\alpha e^{-i2\theta}\rangle a|0,2\rangle + \langle x|\alpha\rangle b|1,1\rangle)$ Equation 15:

$|\Psi_3\rangle = |x\rangle \left( Ae^{-f(x)} a[e^{i\phi(x)}|2,0\rangle - e^{-i\phi(x)}|0,2\rangle] + Ae^{\frac{-x(-2\alpha)^2}{4}} b|1,1\rangle \right)$ where $f(x) = -\frac{1}{4}(x - 2\alpha \cos(2\theta))^2$ and $\phi(x) = \alpha \sin 2\theta(x - 2\alpha \cos(2\theta))$ FIG. 7B shows a probability distribution 700 as a function of the measurement outcome x resulting from homodyne measurement of state $|\Psi_2\rangle$. Probability distribution 700 includes two Gaussian peaks 710 and 720 respectively centered at $2\alpha$ and $2\alpha \cos(2\theta)$ and respectively corresponding to the coefficients of the symmetric and antisymmetric subspace terms in state $|\Psi_3\rangle$ of Equation 15. A measurement outcome equal to an eigenvalue x under Gaussian peak 710 has a near-deterministic probability of corresponding to the symmetric component of state $|\Psi_3\rangle$, and therefore projects the mode M1 and M2 state onto the Hilbert subspace spanned by symmetric Bell states $|B_2\rangle$, $|B_3\rangle$, and $|B_4\rangle$. A measurement outcome equal to an eigenvalue x under Gaussian peak 720 has a near-deterministic probability of corresponding to the antisymmetric component of state $|\Psi_3\rangle$, and therefore projects the mode M1 and M2 state onto the single state $|B_1\rangle$. However, a measurement outcome in a region 730, where the tails of both Gaussian distributions 710 and 720 are small (but theoretically non-zero), may not clearly distinguish the symmetric and antisymmetric terms.

Symmetry analyzer 600A can employ a rule that a measurement outcome x above a boundary point, e.g., above a midpoint x=α(1−cos(2θ)) between the peaks of Gaussian distributions 710 and 720, identifies an antisymmetric state and a measurement outcome x below the boundary point identifies a symmetric state. The probability of error introduced by this rule depends on the integral of the portion of Gaussian distribution 710 extending above the boundary point and the integral of the portion of Gaussian distribution 720 extending below the boundary point. Based on the projected state of Equation 15, the probability $P_{ERROR}$ of error occurring is given in Equation 16 and is less than $10^{-5}$ when the distance between peaks $4\alpha\theta^2$ is greater than about 9, which shows that operation in the regime of weak cross-Kerr nonlinearities (i.e., θ<<π) is possible.

Equation 16:

$$P_{ERROR} = Erfc(\sqrt{2}\,\alpha\theta^2) \text{ where } Erfc(z) = 1 - \int_{-\infty}^{z} dt\, \frac{e^{-\frac{1}{2}t^2}}{\sqrt{2\pi}}$$

The error $P_{ERROR}$ can be reduced if symmetry analyzer 600A uses a measurement interpretation rule that counts measurement outcomes x in a selected region (e.g., region 730) as analysis failures and measurement outcomes above or below the boundaries of the selected region as corresponding to an antisymmetric or symmetric measurement result. This type of rule can reduce the error probability at the expense of introducing the chance of a symmetry analysis failure.

In the event that a measurement outcome indicates an antisymmetric state, measurement system 530 in projector 600A activates phase shifters 550 and 560 to remove the measurement dependent phase shifts φ(x) and −φ(x) associated with the states |2,0> and |0,2>. Each phase shifter is comprised of an optical delay line followed by two Pockels cells. There are a variety of methods for introducing an optical delay, such as the cyclical quantum buffer described below, or a fiber loop delay line as described in K. Banaszek and I. Walmsley, "Photon counting with a loop detector," Opt. Lett. 28, 52 (2003). The Pockels cells introduce a linear phase shift for the horizontally and vertically polarized components of each state, and the phase shifts applied depend on the measurement outcome and can be selected using an electrical signal.

The above description of the operation and errors in a subspace projector presumes use of a cross Kerr nonlinearity to introduce phase shifts. While EIT systems such as described above in general may not produce a perfect cross Kerr nonlinearity, EIT systems do provide a suitable approximation of a cross Kerr nonlinearity in typical working regime, for example, when phase shifts are on the order of about 0.1 radian and α is on the order of about 100. Systems other that EIT systems may also be able to provide interactions that are suitably close to a perfect cross Kerr nonlinearity.

Figure 6B:
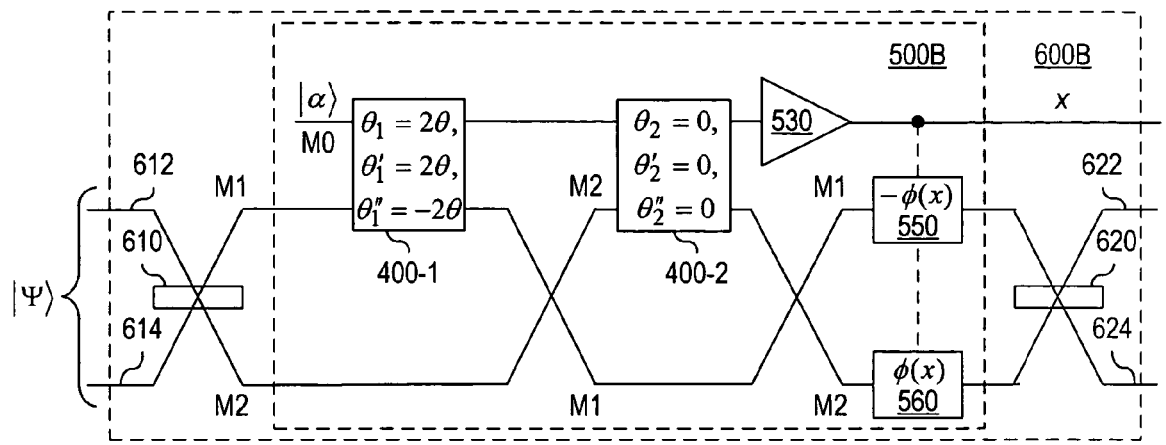

The symmetry analysis in analyzer 600A uses phase shifters 400-1 and 400-2 that provide a phase shift with a non-zero magnitude for states having both photons in one mode M1 or M2 but no phase shift for a state having one photon in each mode M1 and M2. Other subspace projectors using phase shifters with different choices of phase constants can impart similar phase shifts that are also suitable for symmetry analysis of a general 2-qubit state |Ψ>. FIG. 6B, for example, illustrates a symmetry analyzer 600B using an alternative 2-mode subspace projector 500B. In subspace projector 500B, the specific choice of phase constants for phase shifter 400-1 are $\theta_1=2\theta$, $\theta'_1=2\theta$, and $\theta''_1=-2\theta$, making phase shifter 400-1 a polarization-preserving phase shifter. The phase constants $\theta_2$, $\theta'_2$, and $\theta''_2$ for phase shifter 400-2 are all zero. Accordingly, phase shifter 400-2 has no effect and can be omitted.

Phase shifter 400-1 in projector 500B shifts the phase of the probe state by 2θ if there are two photons in mode M1, −2θ if there are two photons in mode M2, and zero if there is one photon in each of the modes M1 and M2. Accordingly, the phase shifts of the relevant states in projector 500B are identical to the phase shifts in projector 500A, and the output state from symmetry analyzer 600B will depend on measurements in the same way as described above for symmetry analyzer 600A of FIG. 6A.

Symmetry analyzer 600B has the advantage of only requiring a single polarization preserving phase shifter 400-1. This advantage may be important, for example, when phase shifters are implemented using EIT systems in which equal but opposite phase shifts may be difficult to implement. However, polarization-preserving phase shifter 400-1 in projector 500B uses controlled phase shifters having phase constants equal to 2θ, instead of phase constants equal to θ, and thus provides the same total phase shift as phase shifters 400-1 and 400-2 in projector 500A.

Symmetry analyzer 600A of FIG. 6A or symmetry analyzer 600B of FIG. 6B can be used as described above to project an arbitrary 2-qubit state either onto the singlet state or onto the Hilbert space spanned by the symmetric Bell states. The projection is non-absorptive so that no photons are lost in the projection. Furthermore, the phase relations between different photon states remain intact. These properties can be used to construct a Bell state analyzer capable of determining which Bell state projection of an analyzed state |Ψ> is output from the analyzer.

Figure 8A:
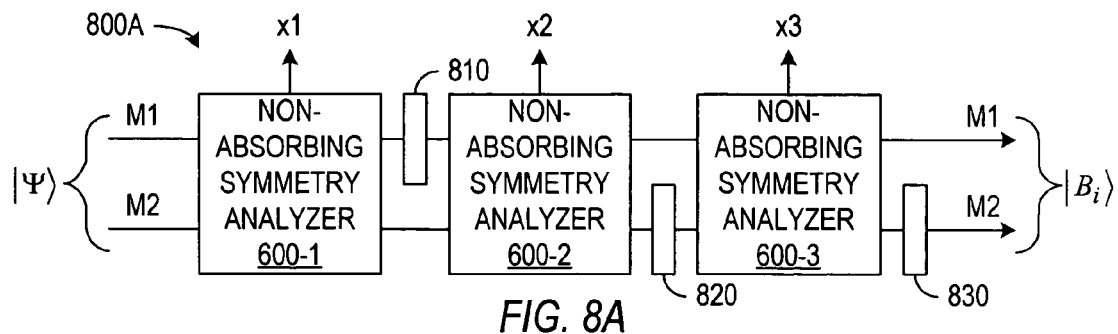
FIGS. 8A and 8B show non-demolition Bell state analyzers in accordance with alternative embodiments of the invention.

FIG. 8A shows a quantum non-demolition Bell state analyzer 800A in accordance with an embodiment of the invention. Bell state analyzer 800A includes three non-absorbing symmetry analyzers 600-1, 600-2, and 600-3, which can be identical to non-absorbing symmetry analyzer 600A or 600B of FIG. 6A or 6B. Optical systems 610, 620, and 630 respectively following analyzers 600-1, 600-2, and 600-3 to effectively permute the Bell states as described further below.

An analyzed state |Ψ> input to Bell state analyzer 800A can be a general two-qubit state such as represented in Equation 7. Non-demolition symmetry analyzer 600-1 operates on analyzed state |Ψ> as described above to measure the symmetry of input state |Ψ>. As described above, symmetry analyzer 600-1 measures a probe state (not shown) and outputs a measurement signal indicating a measurement outcome x1. The measurement projects analyzed state |Ψ> either into singlet state |B$_1$> or into the Hilbert space spanned by symmetric Bell states |B$_2$>, |B$_3$>, and |B$_4$>, and the measurement outcome x1 indicates whether the output state from analyzer 600-1 is in the singlet state |B$_1$> or in a state that is a linear combination of symmetric Bell states |B$_2$>, |B$_3$>, and |B$_4$>.

An optical system 810 transforms the states |B$_1$>, |B$_2$>, |B$_3$>, and |B$_4$> exiting from symmetry analyzer 600-1 respectively into Bell states |B$_2$>, |B$_1$>, |B$_4$>, and |B$_3$>. In an exemplary embodiment of the invention, optical system 810 is a half-wave plate in mode M1. The half-wave plate can be oriented to introduce a negative sign to the states corresponding to a vertically polarized photon in mode M1 and leave the states of horizontally polarized photons unchanged. This effectively permutes the Bell states in the manner desired.

Symmetry analyzer 600-2 then detects whether or not the transformed state from optical system 810 is singlet state $|B_1\rangle$. Measurement of the probe state in symmetry analyzer 600-2 provides a measurement outcome x2 and again projects the 2-qubit state either into singlet state $|B_1\rangle$ or the Hilbert space spanned by symmetric Bell states $|B_2\rangle$, $|B_3\rangle$, and $|B_4\rangle$. More specifically, the output state of analyzer 600-2 will be singlet state $|B_1\rangle$ if measurement outcome x2 indicates an antisymmetric Bell state, Bell state $|B_2\rangle$ if measurement outcome x1 from analyzer 600-1 indicated an antisymmetric Bell state, or a linear combination of Bell states $|B_3\rangle$ and $|B_4\rangle$ if neither measurement outcome x1 or x2 indicates an antisymmetric state.

Optical system 820 further transforms the output state on modes M1 and M2 from symmetry analyzer 600-2. In an exemplary embodiment of the invention, optical system 820 is a half-wave plate in mode M2. The half-wave plate is oriented to transform state $|B_2\rangle$ to $|B_3\rangle$, state $|B_1\rangle$ to $|B_4\rangle$, state $|B_4\rangle$ to $|B_1\rangle$, and state $|B_3\rangle$ to $|B_2\rangle$. As a result, Bell state components $|B_1\rangle$, $|B_2\rangle$, $|B_3\rangle$, and $|B_4\rangle$ of the original input state $|\Psi\rangle$ respectively correspond to states $|B_3\rangle$, $|B_4\rangle$, $|B_1\rangle$, and $|B_2\rangle$ when output from optical system 820.

Symmetry analyzer 600-3 then analyzes whether or not the transformed state from optical system 820 is in singlet state $|B_1\rangle$. If measurement outcome x3 from symmetry analyzer 600-3 corresponds to singlet state $|B_1\rangle$, the output state from analyzer 600-3 is state $|B_1\rangle$. Otherwise, the output state from analyzer 600-3 is in the symmetric Hilbert subspace. More specifically, the output state of analyzer 600-3 will be singlet state $|B_1\rangle$ if the measurement outcome x3 from analyzer 600-3 indicates an antisymmetric Bell state, Bell state $|B_4\rangle$ if the measurement outcome x2 from analyzer 600-2 indicated an antisymmetric state, or Bell state $|B_3\rangle$ if the measurement outcome x1 from analyzer 600-1 indicated an antisymmetric Bell state, or Bell state $|B_2\rangle$ if none of the measurement outcomes x1, x2, and x3 that indicates an antisymmetric state.

Optical system 830, which can be implemented using a half-wave plate with an appropriate orientation in mode M2, transforms the output state from symmetry analyzer 600-3 by converting state $|B_3\rangle$ to $|B_1\rangle$, state $|B_4\rangle$ to $|B_2\rangle$, state $|B_1\rangle$ to $|B_3\rangle$, and state $|B_2\rangle$ to $|B_4\rangle$. Accordingly, the output state from analyzer 800A will be Bell state $|B_1\rangle$ if the measurement outcome x1 from analyzer 600-1 indicates antisymmetry, Bell state $|B_2\rangle$ if the measurement outcome x2 from analyzer 600-2 indicates antisymmetry, Bell state $|B_3\rangle$ the measurement outcome x3 from analyzer 600-3 indicates antisymmetry, and Bell state $|B_4\rangle$ if none of the measurement outcomes x1, x2, or x3 indicates antisymmetry. Accordingly, the measurement signals from analyzers 600-1 to 600-3 thus indicate the output Bell state output from analyzer 800A.

Figure 8B:
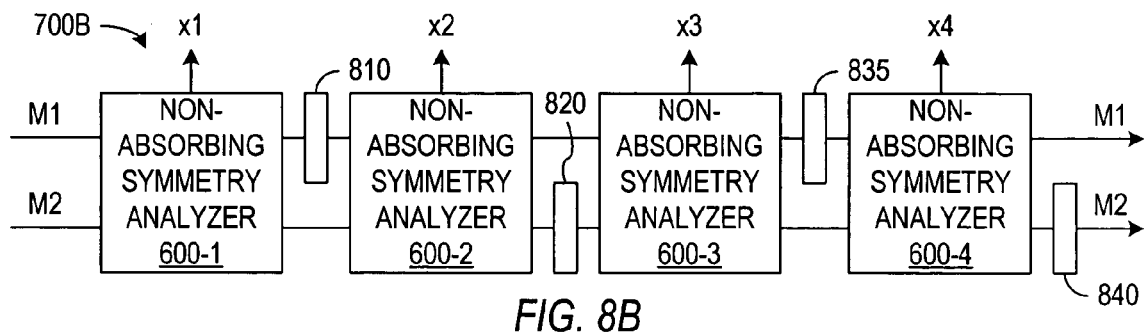

Non-destructive Bell state analyzer 800A relies on failures of detectors 600-1, 600-2, and 600-3 to detect antisymmetry as the measurement signature and corresponding projection onto Bell state $|B_4\rangle$. In this case, inefficiency or error in measurements could result in an analyzer 600-1, 600-2, and 600-3 failing to detect the singlet state, which results in false identification of Bell state $|B_4\rangle$. A Bell state analyzer 800B illustrated in FIG. 8B employs an additional symmetry analyzer 600-4 to distinguish detector failure from detection of Bell state $|B_4\rangle$.

Analyzer 800B uses transformation optics 835 following symmetry analyzer 600-3. Instead of undoing the previous transformations of optical system 810 and 820, optical system 835 transform state $|B_3\rangle$ to $|B_4\rangle$, state $|B_4\rangle$ to $|B_3\rangle$, state $|B_1\rangle$ to $|B_2\rangle$, and state $|B_2\rangle$ to $|B_1\rangle$. Accordingly, if the output state from analyzer 600-3 was Bell state $|B_2\rangle$, the measurement signal from analyzer 600-4 should indicate the antisymmetric state $|B_1\rangle$. Optical system 840 transforms the state $|B_4\rangle$ to $|B_1\rangle$, state $|B_3\rangle$ to $|B_2\rangle$, state $|B_2\rangle$ to $|B_3\rangle$, and state $|B_1\rangle$ to $|B_4\rangle$. The output state from analyzer 800B will be Bell state $|B_1\rangle$ if the measurement signal outcome x1 from analyzer 600-1 indicates antisymmetry, Bell state $|B_2\rangle$ if the measurement outcome x2 from analyzer 600-2 indicates antisymmetry, Bell state $|B_3\rangle$ if the measurement outcome x3 from analyzer 600-3 indicates antisymmetry, and Bell state $|B_4\rangle$ if the measurement outcome x4 from analyzer 600-3 indicates antisymmetry.

Non-absorbing symmetry analyzers such as analyzers 600A and 600B and Bell state analyzers such as analyzers 800A and 800B can be used in quantum information processing systems that analyze an input state and then use the analysis result to control feed forward operations. A useful device for feed forward systems is a Cyclical Quantum Buffer (CQB).

Figure 9:
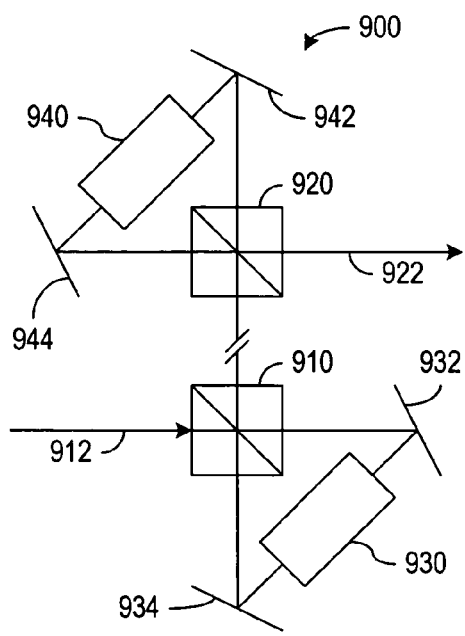
FIG. 9 shows an electro-optic mirror system with photon storage suitable for use in quantum information processing systems in accordance with embodiments of the invention.

FIG. 9 shows an embodiment of a CQB 900 that includes two polarizing beam splitters 910 and 920 and two electro-optic Pockels cells 930 and 940. Polarizing beam splitter 910 has an input port 912 and can receive an input photon state containing horizontally and vertically polarized component states. Polarizing beam splitter 920 has an output port 922. Each polarizing beam splitter 910 and 920 is oriented to transmit the horizontally polarized photons and reflect the vertically polarized photons.

Each of the Pockels cells 930 and 940 is configured so that when a cell 930 or 940 is "on", the Pockels cell transforms horizontally polarized photons to vertically polarized photons and transforms vertically polarized photons to horizontally polarized photons, e.g., swaps polarization states $|H\rangle \leftrightarrow |V\rangle$. When "off", the Pockels cell 930 or 940 leaves the photon state unchanged. Pockels cell 930 has associated turning mirrors 932 and 934 oriented so that a light path through Pockels cell 930 forms a triangular ring having a vertex on mirror 932, a vertex on mirror 934, and a vertex on a polarizing coating within PBS 910. Similarly, Pockels cell 940 has associated turning mirrors 942 and 944 oriented so that a light path through Pockels cell 940 forms a triangular ring having vertices on mirror 942, mirror 944, and within PBS 920.

CQB 900 can be operated to store a photon state, transmit a photon state, or to reflect a photon after a swap of linear polarizations. For prompt transmission of a photon state without a swap of horizontal and vertical polarizations, both Pockels cell 930 or 940 are turned off. For a state input via an input port 912, PBS 910 transmits the horizontally polarized component, which then traverses in a clockwise sense the ring including Pockels cell 930, propagates through PBS 910 and PBS 920, traverses in a counterclockwise sense the ring including Pockels cell 940, and exits through PBS 920. PBS 910 reflects the vertically polarized component, which then traverses in a counterclockwise sense the ring including Pockels cell 930, again reflects from PBS 910, propagates to and reflects from PBS 920, traverses in a clockwise sense the ring including Pockels cell 940, and after a second reflection from PBS 920 exits on an output port 922. The optical path length of CQB 900 is the same for both polarization component states during a prompt transmission without a polarization swap.

For prompt reflection of a photon state with a swap of horizontal and vertical polarizations, one Pockels cell 930 can be turned on, while the other Pockels cell 940 is off. The horizontal polarization component from input port 912 traverses PBS 910 and is reflected from turning mirror 932 into Pockels cell 930, which transforms the horizontally polarized photon(s) into vertically polarized photon(s). The transformed photon state then reflects from PBS 910 and exit back along input port 912. An input vertically polarized component initially reflects from PBS 910, traverses the ring including Pockels cell 930 where the vertical polarization is switched to a horizontal polarization that is transmitted through PBS 910 to exit back along the input port 912.

Operation of EOM 900 for storage can use a clock cycle that corresponds to a prompt transmission time for a photon to traverse the ring associated with Pockels cell 930 or 940. Propagation times elsewhere in CQB 900, e.g., for transmission from PBS 910 to PBS 920 can be synchronized to the clock cycle, but the distance between PBS 910 and PBS 920 can be made long to provide an optical delay. For a storage operation, both Pockels cells 930 and 940 are turned on only after the first pass of the photon state through the ring including Pockels cell 930. With both Pockels cells 930 and 940 on, the horizontal and vertical polarization components follow figure-eight paths including the rings through Pockels cells 930 and 940. The component state that is initially horizontally polarized traverses the figure-eight path in a different direction from that of the component state that is initially vertically polarized. To transmit a photon state with the original polarization (after a chosen delay time), Pocket cell 940 is turned off, and the photon state exits on from PBS 920 via output port 922. To reflect a photon state with a swapped polarization (after a chosen delay time), Pocket cell 930 is turned off, and the photon state exits from PBS 910 back along input port 912.

When used as a storage device, CQB 900 has the advantage of being insensitive to birefringent dephasing because each polarization component alternates between being vertically and horizontally polarized as the polarization component cycles through each ring. Further, since different polarizations traverse the same paths, albeit in opposite directions, acoustic vibrations in structures such as turning mirrors 932, 934, 942, and 944 have matching effects on both components. The primary decoherence mechanism in CQB 900 is loss due to scattering and absorption of photons.

Figure 10:
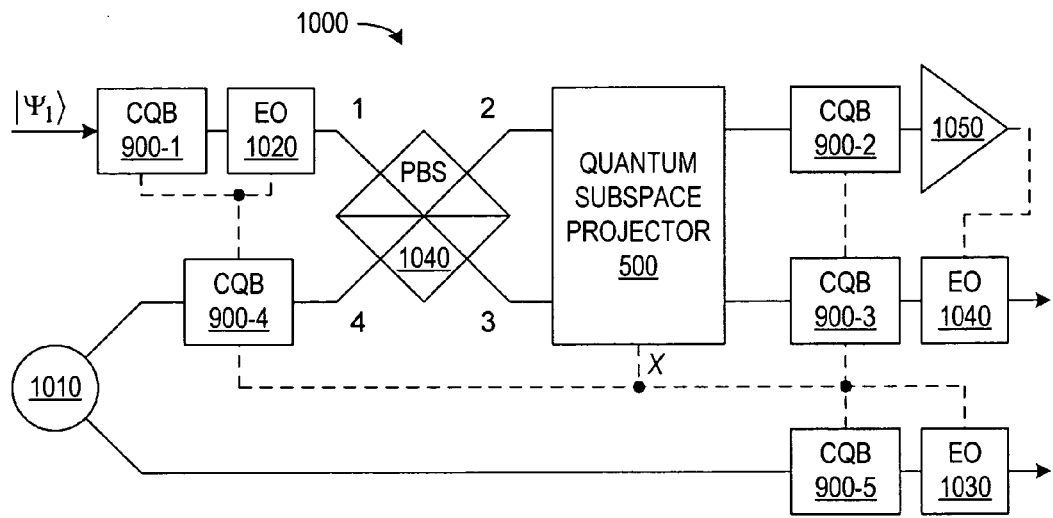
FIG. 10 shows a quantum non-demolition encoder in accordance with an embodiment of the invention.

FIG. 10 shows a quantum non-demolition encoder 1000 that employs a 2-mode quantum subspace projector 500 and five CQBs 900-1 to 900-5. Quantum subspace projector 500 can be substantially identical to quantum subspace projector 500A or 500B of FIGS. 6A and 6B, and CQBs 900-1 to 900-5 can each be substantially identical to CQB 900 of FIG. 9 as described above. Quantum non-demolition encoder 1000 further includes a source 1010 of entangled photon pairs, electro-optic Pockels cells 1020 and 1030, a polarizing beam splitter 1040, and a detector 1050.

In operation, CQBs 900-1 and 900-4 and Pockels cell 1020 are initially off. An input state $|\Psi_1\rangle$, which represents a qubit being encoded, can then enter encoder 1000 via CQB 900-1. Simultaneous with input of state $|\Psi_1\rangle$, source 1010 generates an entangled photon pair in the Bell state $|B_4\rangle$. Equations 17 give states $|\Psi_1\rangle$ and $|B_4\rangle$ in terms of horizontal and vertical polarization states $|H_i\rangle$ and $|V_i\rangle$, wherein a subscript i indicates the photon mode traversing CQB 900-i.

Equations 17:

$$|\Psi_1\rangle = q0|H_1\rangle + q1|V_1\rangle$$

$$|B_4\rangle = \frac{1}{\sqrt{2}}[|H_4 H_5\rangle + |V_4 V_5\rangle]$$

Photons in modes 1 and 4 are incident on PBS 1040, and PBS 1040 outputs photons in modes 2 and 3. The action of PBS 1040 transforms the input product state as indicated in Equation 18. As shown, the first two terms of the transformed state of Equation 18 have one photon in each of modes 2 and 3. The last two terms of the transformed state of Equation 18 have two photons in either mode 3 or 2 and no photons in the other mode 2 or 3.

Equation 18:

$$(q0|H_1\rangle + q1|V_1\rangle) \otimes \frac{1}{\sqrt{2}}[|H_4 H_5\rangle + |V_4 V_5\rangle] \rightarrow$$

$$\frac{q0}{\sqrt{2}}|H_2 H_3 H_5\rangle + \frac{q1}{\sqrt{2}}|H_3 V_3 V_5\rangle + \frac{q0}{\sqrt{2}}|H_3 V_3 V_5\rangle \frac{q1}{\sqrt{2}}|H_2 V_2 H_5\rangle$$

Quantum subspace projector 500 analyzes the state corresponding to modes 2 and 3 and projects the modes 2 and 3 of the transformed state either onto the Hilbert subspace corresponding to the presence of a single photon in each of modes 2 and 3, or onto the Hilbert subspace described by either zero photons or two photons in mode 2 and either two or zero photons in mode 3. If the measurement outcome x from projector 500 identifies a single photon in mode 2, the projected state $|P_1\rangle$ after the measurement is given by Equation 19, and encoder 1000 has succeeded in encoding $|\Psi_1\rangle$ as a triplet of maximally entangled photons.

$$|P_1\rangle = q0|H_2 H_3 H_5\rangle + q1|V_2 V_3 V_5\rangle \qquad \text{Equation 19}$$

If quantum subspace projector 500 does not produces a measurement outcome indicating the singlet state, the projected state $|P_0\rangle$ after the measurement is given by Equation 20. The measurement signal from projector controls CQBs 900-2 and 900-3 so that the photons in modes 2 and 3 return back to PBS 1040, which transforms the state of Equation 20 to the form given in Equation 21. Also in response to the measurement signal, CQB 900-5 can then store the mode 5 photon state while the mode 2 and 3 photons are being returned. In an alternative embodiment of the invention, CQB 900-5 could be replaced with an optical delay line that simply delays output of the mode 5 photon until the mode 2 and 3 photons are ready.

$$|P_0\rangle = q0|H_3 V_3 V_5\rangle + q1|H_2 V_2 H_5\rangle \qquad \text{Equation 20}$$

$$|P_0\rangle \rightarrow q0|H_1 V_4 V_5\rangle + q1|V_1 H_4 H_5\rangle \qquad \text{Equation 21}$$

CQBs 900-1 and 900-4 are then configured to reflect the mode 1 and 4 photons, and electro-optic Pockels cell 1020 is operated to act as a quarter-wave plate. Passing twice through cell 1020 undoes the polarization swap that occurred in mode 1 during reflection in CQB 900-1. However, the reflection in CQB 900-4 swaps the horizontal and vertical polarizations of the mode 4 state, transforming the state to the form given by the left hand side term of Equation 22. PBS 1040 transforms this state after the reflections from CQB 900-1 and 900-4 to the form given by the right hand side of Equation 22. CQB 900-2 and 900-3 are then switched to transmit mode 2 and 3 photons, and EOM 900-5 simultaneously releases the mode 5 photon. Electro-optic Pockels cell 1030 then performs a polarization swap that places the mode 2, 3, and 5 photons in the desired state $|P_1\rangle$ given in Equation 19. Accordingly, neglecting losses, encoder 1000 can produce state $|P_1\rangle$ 100% of the time regardless of the specific measurement result x.

$$q0|H_1 H_4 V_5\rangle + q1|V_1 V_4 H_5\rangle \rightarrow q0|H_2 H_3 V_5\rangle + q1|V_2 V_3 H_5\rangle \qquad \text{Equation 22}$$

A detector 1050 can detect whether the photon state in mode 2 has a polarization state $|F_2\rangle$ or $|S_2\rangle$. This measurement projects the state $|P_1\rangle$ into a subspace depending on the measurement outcome. Feed forward operations base partly on the measurement can then correct the projected state as required for use with a destructive CNOT gate such as described below or a destructive CNOT gate such as described by T. B. Pittman, B. C. Jacobs, and J. D. Franson, "Probabilistic Quantum Logic Operations Using Polarizing Beam Splitters," Phys. Rev. A, Vol. 64, 062311 (2001). To permit use of the mode 2 photon after detection, detector 1050 can be a quantum non-demolition detector (QND) such as described in U.S. patent application Ser. No. 10/412,019, entitled "Photon Number Resolving systems and Methods." Additionally, the measurement from detector 1050 can control an electro-optic Pockels cell 1040 to correct the mode 3 photon state as needed for in the CNOT gate described by Pittman et al.

Figure 11:
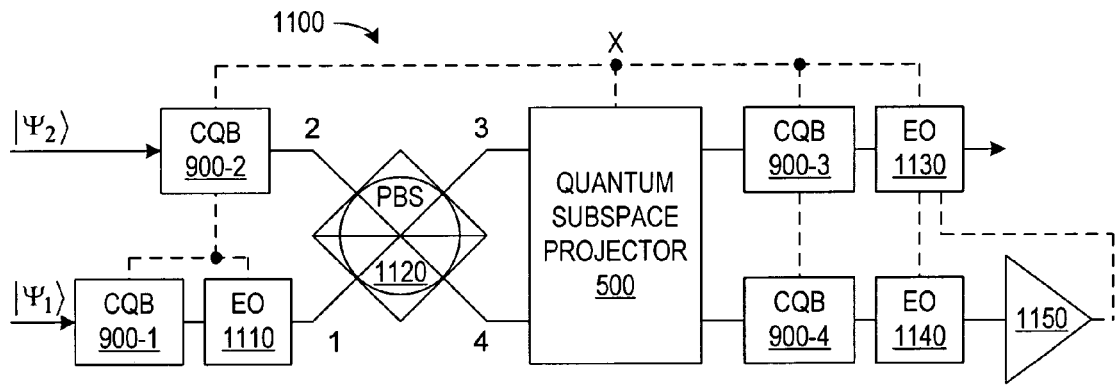
FIG. 11 shows a CNOT gate in accordance with an embodiment of the invention employing a symmetry analyzer.

FIG. 11 shows a destructive CNOT gate 1100 implemented using a quantum subspace projector 500 and four CQBs 900-1 to 900-4. CNOT gate 1100 also includes a 45° polarizing beam splitter 1120 and three electro-optic Pockels cells 1110, 1130, and 1140. In operation, an input state is input to CQB 900-1 and a control state is input to CQB 900-2.

With CQBs 900-1 and 900-2 and Pockels cell 1110 all off, a general input state $|\Psi_1\rangle$ of the form given in Equations 17 is input to EOM 900-1. For the following, a control state that is a vertically polarized state $|V_2\rangle$ is initially assumed as the input to CQB 900-2 for the purpose of determining the effect of CNOT gate 1100 on input state $|\Psi_1\rangle$. The case where the control state is horizontally polarized is considered below.

The product state as given by Expression 23 and described above is applied to 45° PBS 1120, which transforms the input state to the form given by Equation 24. Equation 24 shows that the output state from 45° PBS 1120 (expressed in the HV basis measured by detector 1150) includes a term that is a superposition of states having one photon in each of modes 3 and 4 and a term that is a superposition of states having two photons in one mode 3 or 4 and no photons in the other mode 4 or 3.

Equation 23:

$$|\Psi_1\rangle \otimes |V_2\rangle = \frac{1}{\sqrt{2}}[q0(|F_1\rangle - |S_1\rangle) + q1(|F_1\rangle + |S_1\rangle)] \otimes \frac{1}{\sqrt{2}}(|F_2\rangle + |S_2\rangle) \text{ where } |F_i\rangle = \frac{1}{\sqrt{2}}(|H_i\rangle + |V_i\rangle) \text{ and } |S_i\rangle = \frac{1}{\sqrt{2}}(-|H_i\rangle + |V_i\rangle)$$

Equation 24:

$$\frac{1}{2}[(q0+q1)|F_3F_4\rangle - (q0-q1)|S_3S_4\rangle] + \frac{1}{2}[(q0+q1)|F_3S_3\rangle - (q0-q1)|F_4S_4\rangle] = \frac{1}{2}[q0(|V_3H_4\rangle + |H_3V_4\rangle) + q1(|H_3H_4\rangle + |V_3V_4\rangle)] + \frac{1}{4}[(q0-q1)(|H_4^2\rangle + |V_4^2\rangle) - (q0+q1)(|H_3^2\rangle + |V_3^2\rangle)]$$

Quantum subspace projector 500 analyzes the state corresponding to modes 3 and 4, and projects the state on to either the single-photon term or the zero/two-photon term of Equation 24, depending on a measurement outcome x. The states of modes 3 and 4 are then stored in CQBs 900-3 and 900-4, respectively. If the measurement outcome x indicates projection to the single-photon term, the stored photons in CQBs 900-3 and 900-4 can be released without change. Measurements from polarization-sensitive detector 1150 can be used in a manner described by the Pittman et al. to control EO 1130 and implement a nondestructive CNOT gate. Comments made above describing other embodiments of detector 1050 can be applied to detector 1150.

If the measurement outcome x indicates projection onto the zero/two-photon term of Equation 24, CQBs 900-3 and 900-4 can return the stored photon states to 45° PBS 1020. The 45° PBS 1020 transforms the returned state as indicated in Equation 25. CQB 900-1 and Pockels cell 1110 are then activated to reflect the photon state in mode 1 without causing a polarization exchange, and CQB 900-2 is activated to reflect the photon state in mode 2 with a polarization exchange.

Equation 25:

$$\frac{1}{2}[(q0+q1)|F_3S_3\rangle - (q0-q1)|F_4S_4\rangle] \xrightarrow{PBS} \frac{1}{2}[(q0+q1)|S_1F_2\rangle - (q0-q1)|F_1S_2\rangle]$$

After returning through 45° PBS 1020, the state takes the form given on the left hand side of Equation 26. CQB 900-3 and Pockels cell 1130 are activated to exchange the polarization states of photons in mode 3, and CQB 900-4 and Pockels cell 1140 are activated to exchange the polarization states of photons in mode 4, resulting in the transformation as indicated in Equation 26 to the appropriate output state when the input control state is vertically polarized. The right hand side of Equation 26 is identical to the first term on the left hand side of Equation 24; therefore, the gate is now certain to succeed (following the protocol of Pittman et al.)

Equation 26:

$$\frac{1}{2}[(q0+q1)|S_3S_4\rangle - (q0-q1)|F_3F_4\rangle] \rightarrow \frac{1}{2}[(q0+q1)|F_3F_4\rangle - (q0-q1)|S_3S_4\rangle]$$

If the control state is assumed to be horizontally polarized when input to EOM 900-2, a similar analysis to the above can be performed to show that the state output from 45° PBS 1120 is given by Equation 27. Equation 27 is the same as Equation 24 except for a swap of states $|H_3\rangle$ and $|V_3\rangle$. This is exactly the expected behavior required for successful operation of a destructive CNOT gate. Therefore, the procedure described above for the vertical control state can be followed to ensure that CNOT gate 1100 will function properly with a horizontally polarized control state.

Equation 27:

$$\frac{1}{2}[(q0+q1)|F_3F_4\rangle + (q0-q1)|S_3S_4\rangle] - \frac{1}{2}[(q0+q1)|F_3S_3\rangle + (q0-q1)|F_4S_4\rangle] = \frac{1}{2}[q0(|H_3H_4\rangle + |V_3V_4\rangle) + q1(|V_3H_4\rangle +$$

-continued $$|H_3V_4\rangle)] + \frac{1}{4}[(q0+q1)(|H_3^2\rangle - |V_3^2\rangle) + (q0-q1)(|H_3^2\rangle - |V_3^2\rangle)]$$

A nondestructive CNOT gate can be constructed by combining quantum encoder 1000 with destructive CNOT gate 1100. In this case, the output of EO 1030 in FIG. 10 can be directed to the input of CQB 900-2 in FIG. 11. Measurements from detectors 1050 and 1150 can be used in a manner described by the Pittman et al. to implement a nondestructive CNOT gate that operates near-deterministically.

Figure 12:
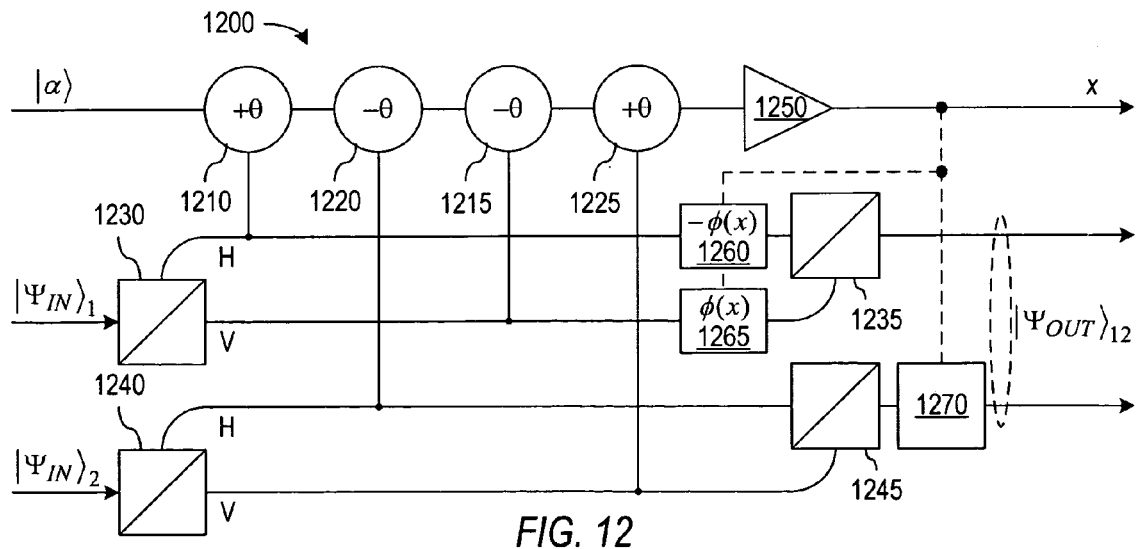
FIG. 12 illustrates an entangler in accordance with an embodiment of the invention.

A nondestructive CNOT gate in accordance with another embodiment of the invention can employ near-deterministic entanglers using controlled phase shifters. FIG. 12 illustrates an embodiment of an entangler 1200 in accordance with an embodiment of the invention. Entangler 1200 includes four controlled phase shifters 1210, 1215, 1220, and 1225 that act on a coherent probe state $|\alpha\rangle$. Each phase shifter 1210, 1215, 1220, or 1225 can be implemented using variety of structure including, for example, the structures describe above in regard to FIGS. 1 and 2A to 2C. As shown in FIG. 12, phase shifters 1210 and 1225 have equal positive phase constants $+\theta$, and phase shifters 1220 and 1215 have equal negative phase constants $-\theta$. Controlled phase shifters 1210 and 1215 are controlled by distinct polarization components of a first input state $|\Psi_{IN}\rangle_1$, and controlled phase shifters 1220 and 1225 are controlled by distinct polarization components of a second input state $|\Psi_{IN}\rangle_2$.

Two input states can be of the general forms $|\Psi_{IN}\rangle_1 = c_0|H_1\rangle + c_1|V_1\rangle$ and $|\Psi_{IN}\rangle_2 = d_0|H_2\rangle + d_1|V_2\rangle$ to represent qubits using polarization representations. Polarizing beam-splitters 1230 and 1240 respectively split input states $|\Psi_{IN}\rangle_1$ and $|\Psi_{IN}\rangle_2$ into spatial modes having orthogonal linear polarizations that then interact with a probe state $|\alpha\rangle$ via cross Kerr nonlinearities implemented in phase shifters 1210, 1215, 1220, and 1225. More specifically, a horizontal polarization component $c_0|H\rangle_1$ of state $|\Psi_{IN}\rangle_1$ controls phase shifter 1210, and a vertical polarization component $c_1|V\rangle_1$ of state $|\Psi_{IN}\rangle_1$ controls phase shifter 1215. A horizontal polarization component $d_0|H\rangle_2$ of state $|\Psi_{IN}\rangle_2$ controls phase shifter 1220, and a vertical polarization component $d_1|V\rangle_2$ of state $|\Psi_{IN}\rangle_2$ controls phase shifter 1225. PBS 1235 and 1245 recombine the horizontal and vertical components after operation of phase shifters 1210, 1215, 1220, and 1225.

Before homodyne detector 1250 measures the probe state, the action of the system evolves the combined input state $|\Psi_1\rangle|\Psi_2\rangle|\alpha\rangle$ as shown in Equation 28. Equation 28 shows that the even-parity components $|HH\rangle$ and $|VV\rangle$ cause no phase shift in the probe state $|\alpha\rangle$ and remain coherent with respect to each other. The odd-parity components $|HV\rangle$ and $|VH\rangle$ cause an opposite sign phase shift $2\theta$, which could allow them to be distinguished by a general homodyne/heterodyne measurement. However if we choose $\alpha$ initially real, an X-quadrature homodyne measurement as described above will not distinguish the states $|\alpha e^{\pm i2\theta}\rangle$. More specifically, with $\alpha$ real, an X-quadrature homodyne measurement projects the state of Equation 28 onto an eigenstate of the X-quadrature operator as indicated in Equation 29.

Equation 28:

$$|\Psi_1\rangle|\Psi_2\rangle|\alpha\rangle \rightarrow [c_0d_0|HH\rangle + c_1d_1|VV\rangle]$$

$$\alpha\rangle + c_0d_1|HV\rangle|\alpha e^{i2\theta}\rangle + c_1d_0|VH\rangle|\alpha e^{-i2\theta}\rangle$$

Equation 29:

$$\xrightarrow{x} |x\rangle(f(x,\alpha)[c_0d_0|HH\rangle + c_1d_1|VV\rangle] +$$
$$f(x, \alpha\cos(2\theta))[c_0d_1 e^{i\phi(x)}|HV\rangle + c_1d_0 e^{i\phi(x)}|VH\rangle])$$

where $$f(x,\beta) = \frac{1}{2\sqrt{\pi}}\exp\left[-\frac{1}{4}(x-2\beta)^2\right] \text{ and } \phi(x) = \alpha x\sin 2\theta - \alpha^2\sin 4\theta$$

A measurement outcome x from homodyne detector 1250 thus projects the state output from PBSs 1235 and 1245 to either state $c_0d_0|HH\rangle + c_1d_1|VV\rangle$ or to state $c_0d_1e^{i\phi(x)}|HV\rangle + c_1d_0e^{-i\phi(x)}|VH\rangle$, depending on the value of measurement outcome x. The measurement thus splits the even parity terms nearly deterministically from the odd parity terms. The choice to call states $|HH\rangle$ and $|VV\rangle$ the even parity states and call states $|HV\rangle$ and $|VH\rangle$ the odd parity states is an arbitrary choice that is primarily dependent on the form/type of PBSs 1230 and 1240 used to convert the polarization encoded qubits $|\Psi_{IN}\rangle_1$ and $|\Psi_{IN}\rangle_2$ to path encoded qubits. Any other choice is also acceptable and does need to be symmetric between the two qubits $|\Psi_{IN}\rangle_1$ and $|\Psi_{IN}\rangle_2$.

The output odd parity is dependent on the measurement outcome x. However, simple local rotations using feed forward to phase shifters 1260 and 1265 can change the odd-parity state to a state that is independent of the measurement outcome x. Alternatively, a single phase shift on any of the four modes from PBSs 1230 and 1240.

With the appropriate choice of amplitudes c0, c1, d0, and d1 of the input states, feed forward transformations in entangler 1200 can create arbitrary entangled states near deterministically. For instance if d0 and d1 are equal to $1/\sqrt{2}$, system 1200 outputs either the state $c_0|HH\rangle + c_1|VV\rangle$ or $c_0|HV\rangle + c_1|VH\rangle$. A flip 1270 of the second polarization when measurement outcome x indicates the odd-parity state transforms the odd-parity state $c_0|HV\rangle + c_1|VH\rangle$ into state $c_0|HH\rangle + c_1|VV\rangle$. System 1200 can thus be configured to acts as a near deterministic entangler. Entangler 1200 can take two separable polarization qubits and efficiently entangle them (near deterministically). Generally, it was thought that strong nonlinearities are required for a deterministic conversion to a maximal entangled state, however entangler 1200 can use weak nonlinearities where the phase shifts $\theta$ are much less than $\pi$.

Figure 13:
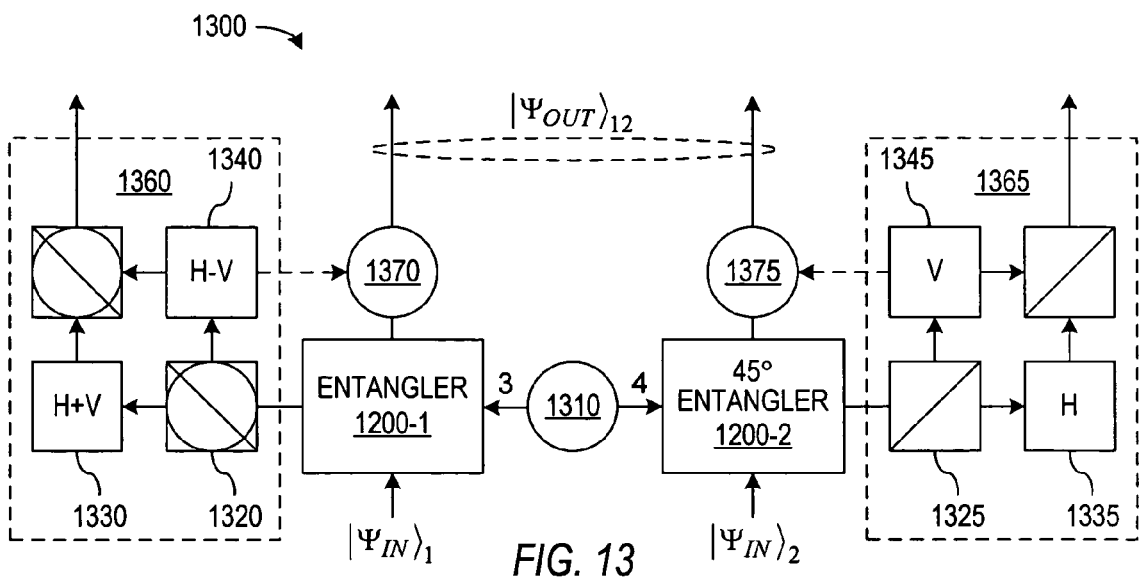
FIG. 13 shows a CNOT gate employing entanglers and feed forward techniques in accordance with an embodiment of the invention.

Entangler 1200 can be employed in an efficient nondestructive CNOT gate. FIG. 13 illustrates one example of a non-destructive CNOT gate 1300 in accordance with an embodiment of the invention. CNOT gate 1300 includes an entangler 1200-1 that can be identical to entangler 1200 of FIG. 12 and a 45° entangler 1200-2. The 45° entangler 1200-2 can be identical to entangler 1200 of FIG. 12 after replacement of PBSs 1230, 1235, 1240, and 1245 in entangler 1200 with 45° polarizing beam splitters.

CNOT gate 1300 also includes a source 1310 of a maximally entangled state $$\frac{1}{\sqrt{2}}(|H_3H_4\rangle + |V_3V_4\rangle).$$

Source 1310 can be implemented using a conventional system known for producing entangled photon pairs, or using a system using an entangler as described above to produce the maximally entangled state.

Consider an initial state of the form given in Equation 30. The action of entangler 1200 evolves the input state as shown Equation 31 to maximally entangle mode 1 photons of input state $|\Psi_{IN}\rangle_1$ with the mode 3 photons from source 1310. A detector 1360 measures whether the mode 3 state is in a polarization state $$|S_3\rangle = \frac{1}{\sqrt{2}}[|H_3\rangle + |V_3\rangle] \text{ or } |F_3\rangle = \frac{1}{\sqrt{2}}[|H_3\rangle - |V_3\rangle].$$

In an exemplary embodiment of the invention detector 1360 is a quantum non-destructive (QND) detector 1360 including a 45°-PBS 1320 that splits the mode three state into polarization components respectively proportional to states $|S_3\rangle$ and $|F_3\rangle$, uses the polarization components to control respective phase shifters 1330 and 1340, and then uses a homodyne measurement to determine the phase shift.

Equation 30:

$$|\Psi_{IN}\rangle_1 \otimes \frac{1}{\sqrt{2}}(|H_3H_4\rangle + |V_3V_4\rangle) \otimes |\Psi_{IN}\rangle_2 = [c_0|H_1\rangle + c_1|V_1\rangle] \otimes \frac{1}{\sqrt{2}}(|H_3H_4\rangle + |V_3V_4\rangle) \otimes [d_0|H_2\rangle + d_1|V_2\rangle]$$

Equation 31:

$$|\Psi_{IN}\rangle_1 \otimes \frac{1}{\sqrt{2}}(|HH\rangle + |VV\rangle) \otimes |\Psi_{IN}\rangle_2 \rightarrow$$

$$\frac{1}{\sqrt{2}}[c_0|H_1H_3H_4\rangle + c_1|V_1V_3V_4\rangle] \otimes [d_0|H_2\rangle + d_1|V_2\rangle]$$

The conditioned state after the measurement of detector 1360 is of the form indicated in Equation 32, where the plus sign is obtained when measurement outcome identifies state $|S_3\rangle$ and the minus sign results when the measurement outcome identifies state $|F_3\rangle$. A simple feed-forward system can perform a sign flip 1370 when the measurement from detector 1360 identifies state $|F_3\rangle$ so that the operation of the left hand side produces the state of Equation 33 regardless of the measurement outcome from detector 1360.

Equation 32:

$$\rightarrow \frac{1}{\sqrt{2}}[c_0|H_1H_4\rangle \pm c_1|V_1V_4\rangle] \otimes [d_0|H_2\rangle + d_1|V_2\rangle]$$

Equation 33:

$$|\Psi_{OUT}\rangle_1 \otimes |\Psi_{IN}\rangle_2 = \frac{1}{\sqrt{2}}[c_0|H_1H_4\rangle + c_1|V_1V_4\rangle] \otimes [d_0|H_2\rangle + d_1|V_2\rangle]$$

The 45°-entangler 1200-2 entangles the mode 4 from source 1320 and mode 2 in input state $|\Psi_{IN}\rangle_2$ to transform the state to the form indicated in Equation 34. A detector 1365 measures the polarization state of photons in mode 4. In an exemplary embodiment, detector is a QND detector including a PBS 1325 that splits the mode 4 photon state, phase shifters 1335 and 1345, and homodyne measurement system. A bit flip 1375 swapping horizontal and vertical polarizations is performed if detector 1365 detects in vertically polarized photon the mode 4. The final state from these interactions and feed forward operations is given in Equation 35, which is the correct result for a CNOT operation on input states $|\Psi_{IN}\rangle_1$ and $|\Psi_{IN}\rangle_2$.

Equation 34:

$$|\Psi_{OUT}\rangle_1 \otimes |\Psi_{IN}\rangle_2 \rightarrow \frac{1}{\sqrt{2}}[[c_0|H_1\rangle - c_1|V_1\rangle](d_0 - d_1)|F_4F_2\rangle + [c_0|H_1\rangle + c_1|V_1\rangle](d_0 + d_1)|S_4S_2\rangle]$$

Equation 35:

$$|\Psi_{OUT}\rangle_{12} \rightarrow \frac{1}{2}[c_0d_0|H_1H_2\rangle + c_0d_1|H_1V_2\rangle + c_1d_0|V_1V_2\rangle + c_1d_1|V_1H_2\rangle]$$

Equation 35 shows that gate 1300 has performed CNOT operation. Further, since the CNOT operation is substantially independent of the measurement outcomes in entanglers 1200-1 and 1200-2, the operation is a near deterministic and correctly succeeds with a high efficiency. From a different perceptive, entangling gates 1200-1 and 1200-2 effectively act like polarizing beam-splitters that do not allow the photon bunching effects. Without these photon bunching effects simple feed-forward operations allows CNOT gate 1300 to be made near deterministic. This represents a huge saving in the physical resources to implement single photon quantum logic.

Although the invention has been described with reference to particular embodiments, the description is only an example of the invention's application and should not be taken as a limitation. Various adaptations and combinations of features of the embodiments disclosed are within the scope of the invention as defined by the following claims.

What is claimed is:

1. A quantum coherent system comprising:
   a plurality of controlled phase shifters;
   a probe electromagnetic mode passing sequentially through the controlled phase shifters; and
   a plurality of control electromagnetic modes that respectively control the controlled phase shifters, wherein quantum states of the control electromagnetic modes respectively control phase shifts that the respective controlled phase shifters impart to a quantum state of the probe electromagnetic mode.

2. The system of claim 1, wherein each of the controlled phase shifters is a polarization preserving controlled phase shifter.

3. The system of claim 1, wherein each of the controlled phase shifters comprises:
   a first controlled shifter having a first phase constant, wherein a first polarization component of the state of the control electromagnetic mode for the controlled phase shifter controls the first controlled shifter;
   a second controlled shifter having a second phase constant, wherein a second polarization component of the state of the control electromagnetic mode for the phase shifter controls the second controlled shifter; and
   a fixed phase shifter.

4. The system of claim 3, wherein for each of the phase shifters, the first phase constant is equal to the second phase constant.

5. The system of claim 1, further comprising a measurement system that measures the probe electromagnetic mode, wherein measurement of the probe electromagnetic mode projects a combined quantum state of the control electromagnetic modes into a Hilbert subspace identified by a measurement outcome from the measurement system.

6. The system of claim 5, wherein the measurement system comprises a homodyne measurement system.

7. The system of claim 5, wherein the measurement system measures an X-quadrature.

8. The system of claim 1, wherein the quantum coherent system comprises an entangling gate.

9. A quantum coherent symmetry analyzer comprising:
a first controlled phase shifter that is polarization-preserving;
a second controlled phase shifter that is polarization-preserving;
a probe electromagnetic mode passing through the first and second controlled phase shifters;
a first control electromagnetic mode that controls the first controlled phase shifter, wherein a quantum state of the first control electromagnetic mode controls a first phase shift that the first controlled phase shifter imparts to a quantum state of the probe electromagnetic mode;
a second control electromagnetic mode that controls the second controlled phase shifter, wherein a quantum state of the second control electromagnetic mode controls a second phase shift that the second controlled phase shifter imparts to the quantum state of the probe electromagnetic mode; and
a measurement system that measures the probe electromagnetic mode.

10. The analyzer of claim 9, further comprising:
a first beam splitter having the first control electromagnetic mode and the second control electromagnetic mode as output modes; and
a second beam splitter having the first control electromagnetic mode and the second control electromagnetic mode as input modes.

11. The analyzer of claim 9, wherein the measurement system comprises a homodyne measurement system.

12. The analyzer of claim 9, further comprising phase correction optics in one of the first and second control modes, wherein phase correction optics introduces a phase shift selected according to a measurement outcome from the measurement system.

13. The analyzer of claim 9, wherein the first controlled phase shifter has a phase constant that is a negative of that of the second controlled phase shifter.

14. A Bell state analyzer comprising:
a first symmetry analyzer, a second symmetry analyzer, and a third symmetry analyzer, wherein each symmetry analyzer has first and second input modes for photon states, first and second output modes for photon states, and a measurement output, and wherein each symmetry analyzer operates to project a state on the input modes into a subspace of states on the first and second output modes, the subspace being identified by the measurement output;
a first photonic system between the first and second symmetry analyzers, wherein the first photonic system transforms a state output from the first symmetry analyzer and inputs a resulting transformed state into the second symmetry analyzer; and
a second photonic system between the second and third symmetry analyzers, wherein the second photonic system transforms a state output from the second symmetry analyzer and inputs a resulting transformed state into the third symmetry analyzer.

15. The analyzer of claim 14, further comprising:
a fourth symmetry analyzer having first and second input modes for photon states, first and second output modes for photon states, and a measurement output, wherein the fourth symmetry analyzer operates to project a state on the input modes into a subspace of states on the first and second output modes, the subspace being identified by the measurement output; and
a third photonic system between the third and fourth symmetry analyzers, wherein the third photonic system transforms a state output from the third symmetry analyzer and inputs a resulting transformed state into the fourth symmetry analyzer.

16. The analyzer of claim 14, further comprising an output photonic system following the third symmetry analyzer, wherein the output photonic system is such that when a Bell state input to the first symmetry analyzer causes a resultant state to be output from the third symmetry analyzer, the output photonic system transforms the resultant state to the Bell state.

17. A CNOT gate comprising:
a first polarizing beam splitter;
a first quantum subspace projector connected to first and second output modes of the first polarizing beam splitter, the first quantum subspace projector producing a first measurement signal identifying a Hilbert subspace to which the first quantum subspace projector projects an input state from the polarizing beam splitter;
output optics operable to output a quantum state from the first quantum subspace projector in response to the first measurement signal identifying a desired Hilbert subspace; and
first correction optics operable to transform a quantum state from the first quantum subspace projector in response to the first measurement signal indicating projection was not onto the desired Hilbert subspace.

18. The CNOT gate of claim 17, further comprising an encoder comprising:
a first mode for input a control photon state;
a source of an entangled state of a second mode and a third mode;
a second polarizing beam splitter having the first mode and the second mode as input modes and having a fourth mode and a fifth mode for output of photon states;
a second quantum state projector connected to project the state of the fourth mode and the fifth mode onto a second Hilbert subspace identified by a second measurement signal output from the second quantum state projector; and
correction optics under control of the second measurement signal and operating on one or more of the first, second, third, fourth, and fifth modes, wherein
the fifth mode is input to the first polarizing beam splitter.

19. A CNOT gate comprising:
an input for a first qubit on a first electromagnetic mode;
an input for a second qubit on a second electromagnetic mode;
a source of an entangled state of a third electromagnetic mode and a fourth electromagnetic mode;
a first entangler connected to entangle the first electromagnetic mode with the third electromagnetic mode;
a first measurement system that measures a polarization state of the third electromagnetic mode after entanglement with the first electromagnetic mode;
first correction optics position to transform a state of the first electromagnetic mode in response to the first measurement system determining that the third electromagnetic mode is in a first polarization state;

a second entangler connected to entangle the second electromagnetic mode with the fourth electromagnetic mode;

a second measurement system that measures a polarization state of the fourth electromagnetic mode after entanglement with the second electromagnetic mode; and second correction optics position to transform a state of the second electromagnetic mode in response to the second measurement system determining that the fourth electromagnetic mode is in a second polarization state.

20. The CNOT gate of claim 19, wherein the first entangler comprises:

a plurality of controlled phase shifters;

a probe electromagnetic mode passing sequentially through the controlled phase shifters; and a plurality of control electromagnetic modes that respectively control the controlled phase shifters, wherein quantum states of the control electromagnetic modes respectively control phase shifts that the respective controlled phase shifters impart to a quantum state of the probe electromagnetic mode.

21. An entangling gate comprising:

a first controlled phase shifter acting on a probe electromagnetic mode and controlled by a first polarization component of a first electromagnetic control mode, the first controlled phase shifter having a phase constant $\theta$;

a second controlled phase shifter acting on the probe electromagnetic mode and controlled by a second polarization component of the first electromagnetic control mode, the second controlled phase shifter having a phase constant $-\theta$;

a third controlled phase shifter acting on the probe electromagnetic mode and controlled by a first polarization component of a second electromagnetic control mode, the third controlled phase shifter having a phase constant $\theta$;

a fourth controlled phase shifter acting on the probe electromagnetic mode and controlled by a second polarization component of the second electromagnetic control mode, the fourth controlled phase shifter having a phase constant $-\theta$;

a measurement system measuring the control electromagnetic mode; and a photonic system operable to transform an output state of the first and second control modes in response to a measurement result from the measurement system.

22. A quantum coherent system comprising:

a first controlled phase shifter;

a second controlled phase shifter;

a probe electromagnetic mode passing sequentially through the first controlled phase shifter and the second controlled phase shifter;

a first polarizing beamsplitter that splits the input electromagnetic mode into a first split mode and a second split mode, wherein the first split mode controls the first controlled phase shifter and the second split mode controls the second controlled phase shifter; and a second polarizing beamsplitter positioned to recombine the first split mode and the second split mode downstream of the first controlled phase shifter and the second controlled phase shifter.

23. The system of claim 22, further comprising a measurement system that measures a phase shift in the probe electromagnetic mode.

24. The system of claim 22, further comprising a fixed phase shifter through which the probe electromagnetic mode passes.

25. The system of claim 24, wherein the first controlled phase shifter has a phase constant that is equal to a phase constant of the second controlled phase shifter and a negative of a fixed phase shift of the fixed phase shifter.

26. The system of claim 22, further comprising:

a first polarization changing element in a path of the second split mode upstream of the second controlled phase shifter, wherein the first polarization changing element changes the second split mode from an initial polarization to a polarization that is the same as that of the first split mode; and a second polarization changing element in a path of the second split mode between the second controlled phase shifter and the second polarizing beamsplitter, wherein the second polarization changing element changes the second split mode back to the initial polarization.

27. The system of claim 26, wherein the first controlled shifter has a phase constant that is equal to a phase constant of the second controlled phase shifter.

* * * * *

UNITED STATES PATENT AND TRADEMARK OFFICE
CERTIFICATE OF CORRECTION

PATENT NO.       : 7,133,173 B2                                    Page 1 of 1
APPLICATION NO.  : 10/899332
DATED            : November 7, 2006
INVENTOR(S)      : Raymond G. Beausoleil, Jr. et al.

It is certified that error appears in the above-identified patent and that said Letters Patent is hereby corrected as shown below:

In column 5, lines 7-8, delete "$\rangle\omega_{12}, \rangle\omega_{32},$ and $\rangle\omega_{34}$" and insert -- $\hbar\omega_{12}, \hbar\omega_{32},$ and $\hbar\omega_{34}$ --, therefor.

In column 5, line 9, delete "
$$\rangle\omega_a = h(\omega_{12}+v_a)$$
$$\rangle\omega_b = h(\omega_{32}+v_b)$$
$$\rangle\omega_c = h(\omega_{43}+v_c)$$
" and insert --
$$\hbar\omega_a = \hbar(\omega_{12}+v_a)$$
$$\hbar\omega_b = \hbar(\omega_{32}+v_b)$$
$$\hbar\omega_c = \hbar(\omega_{43}+v_c)$$
--, therefor.

In column 18, line 15, delete "$\frac{q1}{\sqrt{2}}|H_3 V_3 V_5\rangle$" and insert -- $\frac{q1}{\sqrt{2}}|V_2 V_3 V_5\rangle$ --, therefor.

In column 22, line 27, after "parity" insert -- state --.

$\rangle\omega 12, \rangle\omega_{32},$ and $\rangle\omega_{34}$

Signed and Sealed this

Thirtieth Day of March, 2010

David J. Kappos
*Director of the United States Patent and Trademark Office*